US012701526B2

(12) United States Patent
Yu et al.

(10) Patent No.: US 12,701,526 B2
(45) Date of Patent: Aug. 4, 2026

(54) COMMUNICATION METHOD AND COMMUNICATION APPARATUS

(71) Applicant: Huawei Technologies Co., Ltd., Shenzhen (CN)

(72) Inventors: Tianhang Yu, Hangzhou (CN); Hejia Luo, Hangzhou (CN); Rong Li, Boulogne Billancourt (FR); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/618,631

(22) Filed: Mar. 27, 2024

(65) Prior Publication Data

US 2024/0259977 A1     Aug. 1, 2024

Related U.S. Application Data

(63) Continuation of application No. PCT/CN2022/115396, filed on Aug. 29, 2022.

(30) Foreign Application Priority Data

Sep. 28, 2021     (CN) ......................... 202111146305.X

(51) Int. Cl.
| | |
|---|---|
| *H04W 56/00* | (2009.01) |
| *H04L 1/00* | (2006.01) |
| *H04L 27/26* | (2006.01) |
| *H04W 84/06* | (2009.01) |

(52) U.S. Cl.
CPC ....... *H04W 56/0045* (2013.01); *H04L 1/0007* (2013.01); *H04L 27/2605* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 9,819,197 | B2* | 11/2017 | Kim | H02J 50/40 |
| 2016/0150461 | A1* | 5/2016 | Oyama | H04W 24/10 |
| | | | | 370/328 |
| 2017/0223707 | A1 | 8/2017 | Takano | |
| 2021/0288852 | A1 | 9/2021 | Jia et al. | |

FOREIGN PATENT DOCUMENTS

| | | |
|---|---|---|
| CN | 110140307 A | 8/2019 |
| WO | 2016141519 A1 | 9/2016 |

* cited by examiner

*Primary Examiner* — Hong S Cho
(74) *Attorney, Agent, or Firm* — Slater Matsil, LLP

(57) ABSTRACT

A first communication device receives a first signal from a second communication device, where a first band used for communication between the first communication device and a third communication device overlaps a second band used for communication between the second communication device and a fourth communication device. The first communication device adjusts a start moment of a first transmission frame of the first communication device or an end moment of the first transmission frame based on the first signal.

21 Claims, 14 Drawing Sheets

1200

Communication apparatus

Transceiver module 1201

Processing module 1202

COMMUNICATION METHOD AND COMMUNICATION APPARATUS

CROSS-REFERENCE TO RELATED APPLICATIONS

This application is a continuation of International Application No. PCT/CN2022/115396, field on Aug. 29, 2022, which claims priority to Chinese Patent Application No. 202111146305.X, filed on Sep. 28, 2021. The disclosures of the aforementioned applications are hereby incorporated by reference in their entireties.

TECHNICAL FIELD

This application relates to the field of communication technologies, and in particular, to a communication method and a communication apparatus.

BACKGROUND

Satellite communication has advantages of wide coverage, a long communication distance, high reliability, high flexibility, and a high throughput, and is not affected by a geographical environment, a climate condition, and a natural disaster. Satellite communication has been widely applied to aviation communication, maritime communication, military communication, and other fields.

Satellite communication is introduced into a fifth generation mobile communication technology, which can provide communication services for areas difficult to cover by terrestrial networks, enhance reliability of 5G communication, and provide more data transmission resources to support more communication connections. Therefore, a terminal device having a capability of simultaneously communicating with a terrestrial base station and a satellite has a large market prospect. However, when a frequency band used for communication between the satellite and the terminal device overlaps a frequency band used for communication between the terrestrial base station and the terminal device, interference exists between a signal transmitted between the satellite and the terminal device and a signal transmitted between the terrestrial base station and the terminal device. To avoid the interference between the two signals, a protection area needs to be set between a signal coverage area of the terrestrial base station and a signal coverage area of the satellite, to prevent the satellite and the terrestrial base station from covering a same area.

However, it is difficult or even impossible to serve the protection area by the terrestrial base station, and it is difficult or even impossible to cover the protection area by the satellite. The protection area may be referred to as a coverage blind area. As a result, neither the terrestrial base station nor a location can provide a service for the terminal device in the protection area.

SUMMARY

This application provides a communication method and a communication apparatus, so that a first communication device adjusts a start moment of a first transmission frame of the first communication device or an end moment of the first transmission frame based on a first signal. Therefore, interference coordination or coordinated transmission is facilitated between the first communication device and a second communication device, to alleviate or avoid co-channel coverage interference between the first communication device and the second communication device. In this way, the first communication device and the second communication device provide communication services for a terminal device in co-channel coverage. Therefore, in technical solutions of this application, a protection area does not need to be set to resolve a problem that the first communication device and the second communication device cannot provide services for a terminal device in the protection area.

A first aspect of this application provides a communication method. A first communication device receives a first signal from a second communication device, where a first band used for communication between the first communication device and a third communication device overlaps a second band used for communication between the second communication device and a fourth communication device. The first communication device adjusts a start moment of a first transmission frame of the first communication device or an end moment of the first transmission frame based on the first signal. A time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$. $T_1$ is equal to 0 or a timing advance (timing advance, TA), $T_2$ is a first threshold, and $T_3$ is a second threshold.

It can be learned from the foregoing technical solution that the first communication device adjusts the start moment of the first transmission frame or the end moment of the first transmission frame based on the first signal, so that the time interval between the adjusted start moment of the first transmission frame and the start moment of the second transmission frame of the second communication device falls within a specific interval, and/or the time interval between the adjusted end moment of the first transmission frame and the end moment of the second transmission frame falls within a specific interval. Therefore, interference coordination is facilitated between the first communication device and the second communication device, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area.

In a possible implementation, that the first communication device adjusts a start moment of a first transmission frame of the first communication device or an end moment of the first transmission frame based on the first signal includes:

The first communication device determines the start moment of the second transmission frame or the end moment of the second transmission frame based on the first signal. The first communication device adjusts the start moment of the first transmission frame or the end moment of the first transmission frame based on the start moment of the second transmission frame and/or the end moment of the second transmission frame.

In this possible implementation, the first communication device may obtain the start moment of the second transmission frame or the end moment of the second transmission frame based on the first signal, and then adjust the start moment of the first transmission frame or the end moment of the first transmission frame based on the start moment of the second transmission frame or the end moment of the second transmission frame. In this way, a signal arrival moment difference is controlled within a specific time range, thereby facilitating interference coordination between the first communication device and the second communication device, to alleviate or avoid co-channel coverage interference between the first communication device and the second communication device.

In another possible implementation, the second band is a frequency band used for downlink communication between the second communication device and the fourth communication device, and $T_1$ is equal to 0. The adjusted start moment of the first transmission frame is aligned with the start moment of the second transmission frame, and/or the adjusted end moment of the first transmission frame is aligned with the end moment of the second transmission frame.

In this possible implementation, when the second band is the frequency band used for downlink communication between the second communication device and the fourth communication device, a relationship between the adjusted start moment of the first transmission frame and the start moment of the second transmission frame and a relationship between the adjusted end moment of the first transmission frame and the end moment of the second transmission frame are shown. In this way, a signal arrival moment difference is controlled within a specific time range, thereby facilitating interference coordination between the first communication device and the second communication device, to alleviate or avoid co-channel coverage interference between the first communication device and the second communication device.

In another possible implementation, the second band is a frequency band used for uplink communication between the second communication device and the fourth communication device, and $T_1$ is equal to the TA. That the first communication device adjusts the start moment of the first transmission frame or the end moment of the first transmission frame based on the start moment of the second transmission frame and/or the end moment of the second transmission frame includes:

The first communication device determines the TA. The first communication device adjusts the start moment of the first transmission frame or the end moment of the first transmission frame based on the TA, where the time interval between the adjusted start moment of the first transmission frame and the start moment of the second transmission frame is time of the TA, and/or the time interval between the adjusted end moment of the first transmission frame and the end moment of the second transmission frame is the time of the TA.

In this possible implementation, when the second band is the frequency band used for uplink communication between the second communication device and the fourth communication device, a specific process in which the first communication device adjusts the first transmission frame is shown. In this way, the signal arrival moment difference is controlled within the specific time range, thereby facilitating interference coordination between the first communication device and the second communication device, to alleviate or avoid co-channel coverage interference between the first communication device and the second communication device.

In another possible implementation, that the first communication device determines the TA includes: The first communication device receives first indication information from the second communication device, where the first indication information indicates the TA.

In this possible implementation, the second communication device may indicate the TA to the first communication device, so that the first communication device adjusts the start moment or the end moment of the first transmission frame based on the TA, thereby facilitating interference coordination between the first communication device and the second communication device, to alleviate or avoid co-channel coverage interference between the first communication device and the second communication device.

In another possible implementation, the method further includes: The first communication device sends the TA.

In this possible implementation, the first communication device may send the TA to the third communication device, so that the third communication device obtains the latest TA used by the first communication device. In this way, the third communication device may implement synchronization with the first communication device in time. The updated TA used by the first communication device does not need to be determined by using a synchronization signal block and physical broadcast channel block (SSB) of the first communication device in a next synchronization periodicity, so that the third communication device receives data from the first communication device.

In another possible implementation, the method further includes:

The first communication device sets an advanced cyclic prefix (ACP) before each symbol in the first transmission frame, where a length of the ACP is greater than or equal to a third threshold.

In this possible implementation, the first communication device may set the ACP before the symbol, to avoid or alleviate co-channel coverage interference between the first communication device and the second communication device.

In another possible implementation, the third threshold is any one of the following:

max(normal cyclic prefix (NCP), 2R/c), where max(NCP, 2R/c) is a maximum value of an NCP and 2R/c, R is a cell radius of the first communication device, and c is a speed of light;

max(extended cyclic prefix (ECP), 2R/c), where max (ECP, 2R/c) is a maximum value of an ECP and 2R/c, R is a cell radius of the first communication device, and c is a speed of light; or a sum of a length of an NCP and 2R/c.

In this possible implementation, several possible values of the third threshold are shown, to implement interference coordination between the first communication device and the second communication device, so as to avoid co-channel coverage interference between the first communication device and the second communication device. When the length of the ACP is equal to the third threshold, it may be understood that the first communication device sets the length of the ACP based on a case in which a moment difference between a moment at which a downlink signal between the second communication device and the fourth communication device arrives at the third communication device and a moment at which a downlink signal between the first communication device and the third communication device arrives at the third communication device is close to 2R/c, to avoid co-channel coverage interference between the first communication device and the second communication device.

In another possible implementation, the first communication device determines the length of the ACP based on first information, where the first information includes at least one of the following: the cell radius R of the first communication device, an angle between the second communication device and the ground, or a subcarrier spacing used by the first communication device.

In this possible implementation, the first communication device may determine the length of the ACP based on the first information, to properly set the length of the ACP and implement interference coordination between the first communication device and the second communication device, so as to avoid co-channel coverage interference between the first communication device and the second communication device, and prevent ACP overheads from being high and data transmission efficiency from being affected because the length of the ACP is set to be excessively long.

In another possible implementation, the method further includes: The first communication device sends second indication information, where the second indication information indicates to use the ACP.

In this possible implementation, the first communication device may send the indication information to the second communication device or the third communication device, to indicate to use the ACP. In this way, interference coordination between the first communication device and the second communication device is implemented, to avoid co-channel coverage interference between the first communication device and the second communication device.

In another possible implementation, the second indication information further indicates the length of the ACP.

In this possible implementation, the first communication device may further indicate the length of the ACP. In this way, the second communication device or the third communication device does not need to determine the length of the ACP by itself, thereby reducing complexity of determining the length of the ACP by the second communication device or the third communication device, so that the second communication device or the third communication device performs interference coordination.

In another possible implementation, the method further includes: The first communication device sends third indication information to the second communication device, where the third indication information indicates the second communication device to enable the second band.

In this possible implementation, the first communication device may indicate the second communication device to enable the second band to implement co-channel coverage, thereby implementing joint coverage of a satellite and a base station to provide communication services. The first communication device may flexibly indicate the second communication device to enable the second band, which helps the first communication device properly indicate to enable the second band based on an actual requirement (for example, a service requirement).

In another possible implementation, the method further includes: The first communication device enables a satellite synchronization mode.

In this possible implementation, the satellite synchronization mode may be set for the first communication device, and the first communication device may enable the satellite synchronization mode, to implement joint coverage of the satellite and the base station to provide the communication services.

In another possible implementation, the method further includes:

The first communication device sends fourth indication information to the second communication device, where the fourth indication information indicates a time-frequency resource used by a cell of the first communication device.

In this possible implementation, the first communication device may indicate, to the second communication device, the time-frequency resource used by the cell of the first communication device, so that the second communication device determines, based on the time-frequency resource used by the cell of the first communication device, a time-frequency resource used by the second communication device. That is, interference coordination or coordinated transmission is performed between the first communication device and the second communication device, to alleviate or avoid co-channel coverage interference between the first communication device and the second communication device.

A second aspect of this application provides a communication method. The method includes:

A second communication device receives second indication information from a first communication device, where the second indication information indicates to use an ACP, and a first band used for communication between the first communication device and a third communication device overlaps a second band used for communication between the second communication device and a fourth communication device. The second communication device sets the ACP before each symbol in a second transmission frame of the second communication device based on the second indication information.

In the foregoing technical solution, the first communication device may indicate the second communication device to use the ACP. The second communication device sets the ACP before each symbol in the second transmission frame of the second communication device based on the second indication information. Therefore, co-channel coverage interference between the first communication device and the second communication device is avoided or alleviated. In this way, the first communication device and the second communication device provide communication services for a terminal device in co-channel coverage. Therefore, in the technical solution of this application, a protection area does not need to be set to resolve a problem that the first communication device and the second communication device cannot provide services for a terminal device in the protection area.

In a possible implementation, the method further includes: The second communication device determines a length of the ACP.

In the foregoing implementation, the second communication device first determines the length of the ACP, and then sets the ACP before each symbol in the second transmission frame, to avoid or alleviate co-channel coverage interference between the first communication device and the second communication device.

In another possible implementation, the second indication information further indicates the length of the ACP. That the second communication device determines a length of the ACP includes: The second communication device determines the length of the ACP based on the second indication information.

In this possible implementation, the first communication device may further indicate the length of the ACP. In this way, the second communication device does not need to determine the length of the ACP by itself, thereby reducing complexity of determining the length of the ACP by the second communication device, so that the second communication device performs interference coordination.

In another possible implementation, that the second communication device determines a length of the ACP includes:

The second communication device determines the length of the ACP based on first information, where the first information includes at least one of the following: a cell radius R of the first communication device, an angle between the second communication device and the ground, or a subcarrier spacing used by the first communication device.

In this possible implementation, the second communication device may determine the length of the ACP based on the first information, to properly set the length of the ACP and implement interference coordination between the first communication device and the second communication device, so as to avoid co-channel coverage interference between the first communication device and the second communication device, and prevent ACP overheads from being high and data transmission efficiency from being affected because the length of the ACP is set to be excessively long.

In another possible implementation, the method further includes:

The second communication device sends a TA to the first communication device, where the TA is used by the first communication device to adjust a start moment of a first transmission frame of the first communication device and/or an end moment of the first transmission frame.

In this possible implementation, the second communication device may indicate the TA to the first communication device, so that the first communication device adjusts the start moment or the end moment of the first transmission frame based on the TA, thereby facilitating interference coordination between the first communication device and the second communication device, to alleviate or avoid co-channel coverage interference between the first communication device and the second communication device.

In another possible implementation, the method further includes the second communication device receives third indication information from the first communication device. The second communication device enables the second band based on the third indication information.

In this possible implementation, the first communication device may indicate the second communication device to enable the second band to implement co-channel coverage, thereby implementing joint coverage of a satellite and a base station to provide communication services. The first communication device may flexibly indicate the second communication device to enable the second band, which helps the first communication device properly indicate to enable the second band based on an actual requirement (for example, a service requirement).

In another possible implementation, the method further includes the second communication device sends fifth indication information to the fourth communication device, where the fifth indication information indicates the fourth communication device to use the ACP.

In this possible implementation, the second communication device may indicate the fourth communication device to use the ACP. In this way, the fourth communication device may set the ACP before a symbol of the second transmission frame, to alleviate or avoid co-channel coverage interference between the first communication device and the second communication device.

A third aspect of this application provides a communication method. A second communication device receives fourth indication information from a first communication device, where the fourth indication information indicates a time-frequency resource used by a cell of the first communication device, and a first band used for communication between the first communication device and a third communication device overlaps a second band used for communication between the second communication device and a fourth communication device. The second communication device determines, based on the time-frequency resource used by the cell of the first communication device, a time-frequency resource used by the second communication device, where the time-frequency resource used by the second communication device does not overlap the time-frequency resource used by the cell of the first communication device, or the time-frequency resource used by the second communication device and the time-frequency resource used by the cell of the first communication device are separated by a guard band of a first length in frequency domain.

In the foregoing technical solution, the first communication device may indicate, to the second communication device, the time-frequency resource used by the cell of the first communication device, so that the second communication device can determine, based on the time-frequency resource used by the cell of the first communication device, the time-frequency resource used by the second communication device. That is, interference coordination or coordinated transmission is performed between the first communication device and the second communication device, to alleviate or avoid co-channel coverage interference between the first communication device and the second communication device. In this way, the first communication device and the second communication device provide communication services for a terminal device in co-channel coverage. Therefore, in the technical solution of this application, a protection area does not need to be set to resolve a problem that the first communication device and the second communication device cannot provide services for a terminal device in the protection area.

A fourth aspect of this application provides a communication method. A third communication device receives second indication information from a first communication device, where the second indication information indicates the third communication device to use an ACP, and a first band used for communication between the first communication device and the third communication device overlaps a second band used for communication between a second communication device and a fourth communication device. The third communication device sets, based on the second indication information, the ACP before each symbol of a first transmission frame transmitted between the third communication device and the first communication device.

In the foregoing technical solution, the first communication device may indicate the third communication device to use the ACP. The third communication device sets the ACP before each symbol in the first transmission frame based on the second indication information, to avoid or alleviate co-channel coverage interference between the first communication device and the second communication device. Therefore, in the technical solution of this application, a protection area does not need to be set to resolve a problem that the first communication device and the second communication device cannot provide services for a terminal device in the protection area.

In a possible implementation, the method further includes: The third communication device determines a length of the ACP.

In the foregoing implementation, the third communication device first determines the length of the ACP, and then sets the ACP before each symbol in the first transmission frame, to avoid or alleviate co-channel coverage interference between the first communication device and the second communication device.

In another possible implementation, the second indication information indicates the length of the ACP. That the third communication device determines a length of the ACP includes: The third communication device determines the length of the ACP based on the second indication information.

In this possible implementation, the first communication device may further indicate the length of the ACP to the third communication device. In this way, the third communication device does not need to determine the length of the ACP by itself, thereby reducing complexity of determining the length of the ACP by the third communication device, so that the third communication device performs interference coordination.

In another possible implementation, that the third communication device determines a length of the ACP includes:

The third communication device determines the length of the ACP based on first information, where the first information includes at least one of the following: a cell radius R of the first communication device, an angle between the second communication device and the ground, or a subcarrier spacing used by the first communication device.

The first band used for communication between the first communication device and the third communication device overlaps the second band used for communication between the second communication device and the fourth communication device.

In this possible implementation, the third communication device may determine the length of the ACP based on the first information, to properly set the length of the ACP, so as to avoid co-channel coverage interference between the first communication device and the second communication device, and prevent ACP overheads from being high and data transmission efficiency from being affected because the length of the ACP is set to be excessively long.

In another possible implementation, the third communication device receives a TA from the first communication device. The third communication device adjusts a start moment of the first transmission frame and/or an end moment of the first transmission frame based on the TA, where a time interval between an adjusted start moment of the first transmission frame and a start moment of a second transmission frame falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or the TA, $T_2$ is a first threshold, $T_3$ is a second threshold, and the second transmission frame is a transmission frame between the fourth communication device and the second communication device.

In this possible implementation, the first communication device may send the TA to the third communication device, so that the third communication device obtains the latest TA used by the first communication device. In this way, the third communication device may implement synchronization with the first communication device in time. The updated TA used by the first communication device does not need to be determined until an SSB of the first communication device is used in a next synchronization periodicity, so that the third communication device receives data from the first communication device.

A fifth aspect of this application provides a communication method. A fourth communication device receives fifth indication information from a second communication device, where the fifth indication information indicates the fourth communication device to use an ACP, and a second band used for communication between the second communication device and the fourth communication device overlaps a first band used for communication between a first communication device and a third communication device. The fourth communication device sets, based on the fifth indication information, the ACP before each symbol of a second transmission frame transmitted between the fourth communication device and the second communication device.

In the foregoing technical solution, the second communication device may indicate the fourth communication device to use the ACP. The fourth communication device sets the ACP before each symbol in the second transmission frame based on the fifth indication information. Therefore, co-channel coverage interference between the first communication device and the second communication device is avoided or alleviated. In this way, the first communication device and the second communication device provide communication services for a terminal device in co-channel coverage. Therefore, in the technical solution of this application, a protection area does not need to be set to resolve a problem that the first communication device and the second communication device cannot provide services for a terminal device in the protection area.

In a possible implementation, the method further includes: The fourth communication device determines a length of the ACP.

In the foregoing implementation, the fourth communication device first determines the length of the ACP, and then sets the ACP before each symbol in the second transmission frame, to avoid or alleviate co-channel coverage interference between the first communication device and the second communication device.

In another possible implementation, the fifth indication information indicates the length of the ACP. That the fourth communication device determines a length of the ACP includes: The fourth communication device determines the length of the ACP based on the fifth indication information.

In this possible implementation, the second communication device may indicate the fourth communication device to use the ACP. The fourth communication device may set the ACP before a symbol of the second transmission frame, to alleviate or avoid co-channel coverage interference between the first communication device and the second communication device.

In another possible implementation, that the fourth communication device determines a length of the ACP includes: The fourth communication device determines the length of the ACP based on first information, where the first information includes at least one of the following: a cell radius R of the first communication device, an angle between the second communication device and the ground, or a subcarrier spacing used by the first communication device.

In this possible implementation, the fourth communication device determines the length of the ACP based on the first information, to properly set the length of the ACP, so as to avoid co-channel coverage interference between the first communication device and the second communication device, and prevent ACP overheads from being high and data transmission efficiency from being affected because the length of the ACP is set to be excessively long.

A sixth aspect of this application provides a communication method. A first communication device sends sixth indication information to a second communication device, where the sixth indication information indicates the second communication device to enable or disable an intra-frequency beam. The first communication device enables or disables a satellite synchronization mode.

In the foregoing technical solution, the first communication device may indicate the second communication device to enable or disable the intra-frequency beam, and then the first communication device enables or disables the satellite synchronization module. The first communication device flexibly indicates the second communication device to enable the intra-frequency beam, which helps the first communication device properly indicate to enable the intra-frequency beam based on an actual requirement (for example, a service requirement).

In a possible implementation, the first communication device receives an acknowledgment indication from the second communication device, where the acknowledgment indication indicates that the second communication device determines to enable or disable the intra-frequency beam.

In this possible implementation, the second communication device may send the acknowledgment indication to the first communication device, so that the first communication device determines whether the second communication device enables the intra-frequency beam.

In another possible implementation, that a first communication device sends sixth indication information to a second communication device includes:

The first communication device determines, based on a service in a cell of the first communication device, a time-frequency resource required by the cell and a used subcarrier spacing. The first communication device sends the sixth indication information to the second communication device based on second information, where the second information includes at least one of the following: the time-frequency resource, the service in the cell, and the subcarrier spacing used by the first communication device.

In this possible implementation, the first communication device may determine, based on the second information, to indicate the second communication device to enable or disable the intra-frequency beam, so as to indicate the second communication device to enable or disable the intra-frequency beam based on the service requirement, a service condition, and the like. For example, the first communication device determines to enable or disable the intra-frequency beam based on the subcarrier spacing used by the first communication device. When the subcarrier spacing is large, if the first communication device and the second communication device use co-channel coverage, and each of the first communication device and the second communication device uses an ACP to perform interference coordination, a ratio of a length of the ACP to a symbol length is large, which causes low transmission efficiency. Therefore, based on an actual service requirement and the subcarrier spacing, the first communication device may more properly indicate the second communication device to enable or disable the intra-frequency beam.

In another possible implementation, that the first communication device sends the sixth indication information to the second communication device based on second information includes the first communication device sends the sixth indication information to the second communication device when a ratio of the time-frequency resource used by the cell of the first communication device to an available time-frequency resource of the first communication device is less than a fourth threshold, and/or when the cell does not need to use a first subcarrier spacing to provide a service, where the sixth indication information indicates the second communication device to enable the intra-frequency beam, and the first subcarrier spacing is greater than or equal to a fifth threshold. That the first communication device enables or disables a satellite synchronization mode includes: The first communication device enables the satellite synchronization mode.

In this possible implementation, a specific solution in which the first communication device sends the sixth indication information based on the second information is shown, to properly indicate the second communication device to enable or disable the intra-frequency beam.

In another possible implementation, that the first communication device sends the sixth indication information to the second communication device based on second information includes: when the service in the cell of the first communication device has high importance, the first communication device sends the sixth indication information to the second communication device, where the sixth indication information indicates the second communication device to disable the intra-frequency beam.

That the first communication device enables or disables a satellite synchronization mode includes the first communication device disables the satellite synchronization mode.

In this possible implementation, if the service in the cell is important, the first communication device may independently provide a communication service, to ensure service reliability.

In another possible implementation, that the first communication device sends the sixth indication information to the second communication device based on second information includes: The first communication device sends the sixth indication information to the second communication device when the service in the cell of the first communication device has low importance, where the sixth indication information indicates the second communication device to enable the intra-frequency beam.

That the first communication device enables or disables a satellite synchronization mode includes the first communication device disables the satellite synchronization mode.

In this possible implementation, if the service in the cell has low importance, the first communication device may indicate the second communication device to enable the intra-frequency beam, and the second communication device provides a communication service. The first communication device may not enable the satellite synchronization mode.

A seventh aspect of this application provides a communication method. A second communication device receives sixth indication information from a first communication device, where the sixth indication information indicates the second communication device to enable or disable an intra-frequency beam. The second communication device enables or disables the intra-frequency beam based on the sixth indication information.

In the foregoing technical solution, the second communication device receives the sixth indication information from the first communication device, to indicate the second communication device to enable or disable the intra-frequency beam, and then the second communication device enables or disables the intra-frequency beam based on the sixth indication information. The first communication device flexibly indicates the second communication device to enable the intra-frequency beam, which helps the first communication device properly indicate to enable the intra-frequency beam based on an actual requirement (for example, a service requirement).

In a possible implementation, the method further includes: The second communication device sends an acknowledgment indication to the first communication device, where the acknowledgment indication indicates that the second communication device determines to enable or disable the intra-frequency beam.

In this possible implementation, the second communication device may send the acknowledgment indication to the first communication device, so that the first communication device determines whether the second communication device enables the intra-frequency beam.

An eighth aspect of this application provides a communication apparatus. The communication apparatus includes a transceiver module, configured to receive a first signal from a second communication device, where a first band used for communication between the communication apparatus and a third communication device overlaps a second band used for communication between the second communication device and a fourth communication device; and a processing module, configured to adjust a start moment of a first transmission frame of the communication apparatus or an end moment of the first transmission frame based on the first signal, where a time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or a TA, $T_2$ is a first threshold, and $T_3$ is a second threshold.

In a possible implementation, the processing module is specifically configured to: determine the start moment of the second transmission frame or the end moment of the second transmission frame based on the first signal; and adjust the start moment of the first transmission frame or the end moment of the first transmission frame based on the start moment of the second transmission frame and/or the end moment of the second transmission frame.

In another possible implementation, the second band is a frequency band used for downlink communication between the second communication device and the fourth communication device, and $T_1$ is equal to 0. The adjusted start moment of the first transmission frame is aligned with the start moment of the second transmission frame, and/or the adjusted end moment of the first transmission frame is aligned with the end moment of the second transmission frame.

In another possible implementation, the second band is a frequency band used for uplink communication between the second communication device and the fourth communication device, and $T_1$ is equal to the TA. The processing module is specifically configured to: determine the TA; and adjust the start moment of the first transmission frame or the end moment of the first transmission frame based on the TA, where the time interval between the adjusted start moment of the first transmission frame and the start moment of the second transmission frame is time of the TA, and/or the time interval between the adjusted end moment of the first transmission frame and the end moment of the second transmission frame is the time of the TA.

In another possible implementation, the processing module is specifically configured to: receive first indication information from the second communication device, where the first indication information indicates the TA.

In another possible implementation, the transceiver module is further configured to send the TA.

In another possible implementation, the processing module is further configured to: set an ACP before each symbol in the first transmission frame, where a length of the ACP is greater than or equal to a third threshold.

In another possible implementation, the third threshold is any one of the following:

max(NCP, 2R/c), where max(NCP, 2R/c) is a maximum value of an NCP and 2R/c, R is a cell radius of the communication apparatus, and c is a speed of light;

max(ECP, 2R/c), where max(ECP, 2R/c) is a maximum value of an ECP and 2R/c, R is a cell radius of the communication apparatus, and c is a speed of light; or a sum of a length of an NCP and 2R/c.

In another possible implementation, the processing module is specifically configured to:

determine the length of the ACP based on first information, where the first information includes at least one of the following: the cell radius R of the communication apparatus, an angle between the second communication device and the ground, or a subcarrier spacing used by the communication apparatus.

In another possible implementation, the transceiver module is further configured to:

send second indication information, where the second indication information indicates to use the ACP.

In another possible implementation, the second indication information further indicates the length of the ACP.

In another possible implementation, the transceiver module is further configured to: send third indication information to the second communication device, where the third indication information indicates the second communication device to enable the second band.

In another possible implementation, the processing module is further configured to: enable a satellite synchronization mode.

In another possible implementation, the transceiver module is further configured to: send fourth indication information to the second communication device, where the fourth indication information indicates a time-frequency resource used by a cell of the communication apparatus.

A ninth aspect of this application provides a communication apparatus. The communication apparatus includes: a transceiver module, configured to receive second indication information from a first communication device, where the second indication information indicates to use an ACP, and a first band used for communication between the first communication device and a third communication device overlaps a second band used for communication between the communication apparatus and a fourth communication device; and a processing module, configured to set the ACP before each symbol in a second transmission frame of the communication apparatus based on the second indication information.

In a possible implementation, the processing module is further configured to: determine a length of the ACP.

In another possible implementation, the second indication information further indicates the length of the ACP; and the processing module is specifically configured to: determine the length of the ACP based on the second indication information.

In another possible implementation, the processing module is specifically configured to: determine the length of the ACP based on first information, where the first information includes at least one of the following: a cell radius R of the first communication device, an angle between the communication apparatus and the ground, or a subcarrier spacing used by the first communication device.

In another possible implementation, the transceiver module is further configured to: send a TA to the first communication device, where the TA is used by the first communication device to adjust a start moment of a first transmission frame of the first communication device and/or an end moment of the first transmission frame.

In another possible implementation, the transceiver module is further configured to: receive third indication information from the first communication device.

The processing module is further configured to: enable the second band based on the third indication information.

In another possible implementation, the transceiver module is further configured to: send fifth indication information to the fourth communication device, where the fifth indication information indicates the fourth communication device to use the ACP.

A tenth aspect of this application provides a communication apparatus. The communication apparatus includes: a transceiver module, configured to receive fourth indication information from a first communication device, where the fourth indication information indicates a time-frequency resource used by a cell of the first communication device, and a first band used for communication between the first communication device and a third communication device overlaps a second band used for communication between the communication apparatus and a fourth communication device; and a processing module, configured to determine, based on the time-frequency resource used by the cell of the first communication device, a time-frequency resource used by the communication apparatus, where the time-frequency resource used by the communication apparatus does not overlap the time-frequency resource used by the cell of the first communication device, or the time-frequency resource used by the communication apparatus and the time-frequency resource used by the cell of the first communication device are separated by a guard band of a first length in frequency domain.

An eleventh aspect of this application provides a communication apparatus. The communication apparatus includes: a transceiver module, configured to receive second indication information from a first communication device, where the second indication information indicates the communication apparatus to use an ACP, and a first band used for communication between the first communication device and the communication apparatus overlaps a second band used for communication between a second communication device and a fourth communication device; and a processing module, configured to set, based on the second indication information, the ACP before each symbol of a first transmission frame transmitted between the communication apparatus and the first communication device.

In a possible implementation, the processing module is further configured to: determine a length of the ACP.

In another possible implementation, the second indication information indicates the length of the ACP; and the processing module is further configured to: determine the length of the ACP based on the second indication information.

In another possible implementation, the processing module is further configured to: determine the length of the ACP based on first information, where the first information includes at least one of the following: a cell radius R of the first communication device, an angle between the second communication device and the ground, or a subcarrier spacing used by the first communication device.

The first band used for communication between the first communication device and the communication apparatus overlaps the second band used for communication between the second communication device and the fourth communication device.

In another possible implementation, the transceiver module is further configured to: receive a TA from the first communication device.

The processing module is further configured to: adjust a start moment of the first transmission frame and/or an end moment of the first transmission frame based on the TA, where a time interval between an adjusted start moment of the first transmission frame and a start moment of a second transmission frame falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or the TA, $T_2$ is a first threshold, $T_3$ is a second threshold, and the second transmission frame is a transmission frame between the fourth communication device and the second communication device.

A twelfth aspect of this application provides a communication apparatus. The communication apparatus includes a transceiver module, configured to receive fifth indication information from a second communication device, where the fifth indication information indicates the communication apparatus to use an ACP, and a second band used for communication between the second communication device and the communication apparatus overlaps a first band used for communication between a first communication device and a third communication device; and a processing module, configured to set, based on the fifth indication information, the ACP before each symbol of a second transmission frame transmitted between the communication apparatus and the second communication device.

In a possible implementation, the processing module is further configured to: determine a length of the ACP.

In another possible implementation, the fifth indication information indicates the length of the ACP; and the processing module is specifically configured to: determine the length of the ACP based on the fifth indication information.

In another possible implementation, the processing module is specifically configured to: determine the length of the ACP based on first information, where the first information includes at least one of the following: a cell radius R of the first communication device, an angle between the second communication device and the ground, or a subcarrier spacing used by the first communication device.

The first band used for communication between the first communication device and the third communication device overlaps the second band used for communication between the second communication device and the communication apparatus.

A thirteenth aspect of this application provides a communication apparatus. The communication apparatus includes: a transceiver module, configured to send sixth indication information to a second communication device, where the sixth indication information indicates the second communication device to enable or disable an intra-frequency beam; and a processing module, configured to enable or disable a satellite synchronization mode.

In a possible implementation, the transceiver module is further configured to: receive an acknowledgment indication from the second communication device, where the acknowledgment indication indicates that the second communication device determines to enable or disable the intra-frequency beam.

In another possible implementation, the transceiver module is specifically configured to: determine, based on a service in a cell of the communication apparatus, a time-frequency resource required by the cell and a used subcarrier spacing; and send the sixth indication information to the second communication device based on second information, where the second information includes at least one of the following: the time-frequency resource, the service in the cell, and the subcarrier spacing used by the communication apparatus.

In another possible implementation, the transceiver module is specifically configured to: send the sixth indication information to the second communication device when a ratio of the time-frequency resource used by the cell of the communication apparatus to an available time-frequency resource of the communication apparatus is less than a fourth threshold, and/or when the cell does not need to use a first subcarrier spacing to provide a service, where the sixth indication information indicates the second communication device to enable the intra-frequency beam, and the first subcarrier spacing is greater than or equal to a fifth threshold.

The processing module is specifically configured to: enable the satellite synchronization mode.

In another possible implementation, the transceiver module is specifically configured to: when the service in the cell of the communication apparatus has high importance, send the sixth indication information to the second communication device, where the sixth indication information indicates the second communication device to disable the intra-frequency beam.

The processing module is specifically configured to: disable the satellite synchronization mode.

In another possible implementation, the transceiver module is specifically configured to: when the service in the cell of the communication apparatus has low importance, the communication apparatus sends the sixth indication information to the second communication device, where the sixth indication information indicates the second communication device to enable the intra-frequency beam.

The processing module is specifically configured to: disable the satellite synchronization mode.

A fourteenth aspect of this application provides a communication apparatus. The communication apparatus includes: a transceiver module, configured to receive sixth indication information from a first communication device, where the sixth indication information indicates the communication apparatus to enable or disable an intra-frequency beam; and a processing module, configured to enable or disable the intra-frequency beam based on the sixth indication information.

In a possible implementation, the transceiver module is further configured to: send an acknowledgment indication to the first communication device, where the acknowledgment indication indicates that the communication apparatus determines to enable or disable the intra-frequency beam.

A fifteenth aspect of this application provides a communication apparatus. The communication apparatus includes an input/output interface and a logic circuit.

The input/output interface is configured to receive a first signal from a second communication device, where a first band used for communication between the communication apparatus and a third communication device overlaps a second band used for communication between the second communication device and a fourth communication device.

The logic circuit is configured to adjust a start moment of a first transmission frame of the communication apparatus or an end moment of the first transmission frame based on the first signal, where a time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or a TA, $T_2$ is a first threshold, and $T_3$ is a second threshold.

In a possible implementation, the logic circuit is specifically configured to:

determine the start moment of the second transmission frame or the end moment of the second transmission frame based on the first signal; and adjust the start moment of the first transmission frame or the end moment of the first transmission frame based on the start moment of the second transmission frame and/or the end moment of the second transmission frame.

In another possible implementation, the second band is a frequency band used for downlink communication between the second communication device and the fourth communication device. The adjusted start moment of the first transmission frame is aligned with the start moment of the second transmission frame, and/or the adjusted end moment of the first transmission frame is aligned with the end moment of the second transmission frame.

In another possible implementation, the second band is a frequency band used for uplink communication between the second communication device and the fourth communication device. The logic circuit is specifically configured to:

determine the TA; and adjust the start moment of the first transmission frame or the end moment of the first transmission frame based on the TA, where the time interval between the adjusted start moment of the first transmission frame and the start moment of the second transmission frame is time of the TA, and/or the time interval between the adjusted end moment of the first transmission frame and the end moment of the second transmission frame is the time of the TA.

In another possible implementation, the logic circuit is specifically configured to: receive first indication information from the second communication device, where the first indication information indicates the TA.

In another possible implementation, the input/output interface is further configured to send the TA.

In another possible implementation, the logic circuit is further configured to: set an ACP before each symbol in the first transmission frame, where a length of the ACP is greater than or equal to a third threshold.

In another possible implementation, the third threshold is any one of the following:

max(NCP, 2R/c), where max(NCP, 2R/c) is a maximum value of an NCP and 2R/c, R is a cell radius of the communication apparatus, and c is a speed of light;

max(ECP, 2R/c), where max(ECP, 2R/c) is a maximum value of an ECP and 2R/c, R is a cell radius of the communication apparatus, and c is a speed of light; or a sum of a length of an NCP and 2R/c.

In another possible implementation, the logic circuit is specifically configured to: determine the length of the ACP based on first information, where the first information includes at least one of the following: the cell radius R of the communication apparatus, an angle between the second communication device and the ground, or a subcarrier spacing used by the communication apparatus.

In another possible implementation, the input/output interface is further configured to:

send second indication information, where the second indication information indicates to use the ACP.

In another possible implementation, the second indication information further indicates the length of the ACP.

In another possible implementation, the input/output interface is further configured to:

send third indication information to the second communication device, where the third indication information indicates the second communication device to enable the second band.

In another possible implementation, the logic circuit is further configured to: enable a satellite synchronization mode.

In another possible implementation, the input/output interface is further configured to:

send fourth indication information to the second communication device, where the fourth indication information indicates a time-frequency resource used by a cell of the communication apparatus.

A sixteenth aspect of this application provides a communication apparatus. The communication apparatus includes an input/output interface and a logic circuit.

The input/output interface is configured to receive second indication information from a first communication device, where the second indication information indicates to use an ACP, and a first band used for communication between the first communication device and a third communication device overlaps a second band used for communication between the communication apparatus and a fourth communication device.

The logic circuit is configured to set the ACP before each symbol in a second transmission frame of the communication apparatus based on the second indication information.

In a possible implementation, the logic circuit is further configured to:

determine a length of the ACP.

In another possible implementation, the second indication information further indicates the length of the ACP; and the logic circuit is specifically configured to:

determine the length of the ACP based on the second indication information.

In another possible implementation, the logic circuit is specifically configured to:

determine the length of the ACP based on first information, where the first information includes at least one of the following: a cell radius R of the first communication device, an angle between the communication apparatus and the ground, or a subcarrier spacing used by the first communication device.

In another possible implementation, the input/output interface is further configured to:

send a TA to the first communication device, where the TA is used by the first communication device to adjust a start moment of a first transmission frame of the first communication device and/or an end moment of the first transmission frame.

In another possible implementation, the input/output interface is further configured to:

receive third indication information from the first communication device.

The logic circuit is further configured to:

enable the second band based on the third indication information, where the second band is a frequency band used for communication between the communication apparatus and the fourth communication device, the second band overlaps the first band, and the first band is a frequency band used for communication between the first communication device and the third communication device.

In another possible implementation, the input/output interface is further configured to:

send fifth indication information to the fourth communication device, where the fifth indication information indicates the fourth communication device to use the ACP.

A seventeenth aspect of this application provides a communication apparatus. The communication apparatus includes an input/output interface and a logic circuit.

The input/output interface is configured to receive fourth indication information from a first communication device, where the fourth indication information indicates a time-frequency resource used by a cell of the first communication device, and a first band used for communication between the first communication device and a third communication device overlaps a second band used for communication between the communication apparatus and a fourth communication device.

The logic circuit is configured to determine, based on the time-frequency resource used by the cell of the first communication device, a time-frequency resource used by the communication apparatus, where the time-frequency resource used by the communication apparatus does not overlap the time-frequency resource used by the cell of the first communication device, or the time-frequency resource used by the communication apparatus and the time-frequency resource used by the cell of the first communication device are separated by a guard band of a first length in frequency domain.

An eighteenth aspect of this application provides a communication apparatus. The communication apparatus includes an input/output interface and a logic circuit.

The input/output interface is configured to receive second indication information from a first communication device, where the second indication information indicates the communication apparatus to use an ACP, and a first band used for communication between the first communication device and the communication apparatus overlaps a second band used for communication between a second communication device and a fourth communication device.

The logic circuit is configured to set, based on the second indication information, the ACP before each symbol of a first transmission frame transmitted between the communication apparatus and the first communication device.

In a possible implementation, the logic circuit is further configured to:

determine a length of the ACP.

In another possible implementation, the second indication information indicates the length of the ACP; and the logic circuit is further configured to:

determine the length of the ACP based on the second indication information.

In another possible implementation, the logic circuit is further configured to:

determine the length of the ACP based on first information, where the first information includes at least one of the following: a cell radius R of the first communication device, an angle between the second communication device and the ground, or a subcarrier spacing used by the first communication device.

The first band used for communication between the first communication device and the communication apparatus overlaps the second band used for communication between the second communication device and the fourth communication device.

In another possible implementation, the input/output interface is further configured to:

receive a TA from the first communication device.

The logic circuit is further configured to:

adjust a start moment of the first transmission frame and/or an end moment of the first transmission frame based on the TA, where a time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or the TA, $T_2$ is a first threshold, $T_3$ is a second threshold, and the second transmission frame is a transmission frame between the fourth communication device and the second communication device.

A nineteenth aspect of this application provides a communication apparatus. The communication apparatus includes an input/output interface and a logic circuit.

The input/output interface is configured to receive fifth indication information from a second communication device, where the fifth indication information indicates the communication apparatus to use an ACP, and a second band used for communication between the second communication device and the communication apparatus overlaps a first band used for communication between a first communication device and a third communication device.

The logic circuit is configured to set, based on the fifth indication information, the ACP before each symbol of a second transmission frame transmitted between the communication apparatus and the second communication device.

In a possible implementation, the logic circuit is further configured to:

determine a length of the ACP.

In another possible implementation, the fifth indication information indicates the length of the ACP; and the logic circuit is specifically configured to:

determine the length of the ACP based on the fifth indication information.

In another possible implementation, the logic circuit is specifically configured to:

determine the length of the ACP based on first information, where the first information includes at least one of the following: a cell radius R of the first communication device, an angle between the second communication device and the ground, or a subcarrier spacing used by the first communication device.

The first band used for communication between the first communication device and the third communication device overlaps the second band used for communication between the second communication device and the communication apparatus.

A twentieth aspect of this application provides a communication apparatus. The communication apparatus includes an input/output interface and a logic circuit.

The input/output interface is configured to send sixth indication information to a second communication device, where the sixth indication information indicates the second communication device to enable or disable an intra-frequency beam.

The logic circuit is configured to enable or disable a satellite synchronization mode.

In a possible implementation, the input/output interface is further configured to:

receive an acknowledgment indication from the second communication device, where the acknowledgment indication indicates that the second communication device determines to enable or disable the intra-frequency beam.

In another possible implementation, the input/output interface is specifically configured to:

determine, based on a service in a cell of the communication apparatus, a time-frequency resource required by the cell and a used subcarrier spacing; and send the sixth indication information to the second communication device based on second information, where the second information includes at least one of the following: the time-frequency resource, the service in the cell, and the subcarrier spacing used by the communication apparatus.

In another possible implementation, the input/output interface is specifically configured to:

send the sixth indication information to the second communication device when a ratio of the time-frequency resource used by the cell of the communication apparatus to an available time-frequency resource of the communication apparatus is less than a fourth threshold, and/or when the cell does not need to use a first subcarrier spacing to provide a service, where the sixth indication information indicates the second communication device to enable the intra-frequency beam, and the first subcarrier spacing is greater than or equal to a fifth threshold.

The logic circuit is specifically configured to:

enable the satellite synchronization mode.

In another possible implementation, the input/output interface is specifically configured to:

when the service in the cell of the communication apparatus has high importance, send the sixth indication information to the second communication device, where the sixth indication information indicates the second communication device to disable the intra-frequency beam.

The logic circuit is specifically configured to:

disable the satellite synchronization mode.

In another possible implementation, the input/output interface is specifically configured to:

when the service in the cell of the communication apparatus has low importance, the communication apparatus sends the sixth indication information to the second communication device, where the sixth indication information indicates the second communication device to enable the intra-frequency beam.

The logic circuit is specifically configured to:

disable the satellite synchronization mode.

A twenty-first aspect of this application provides a communication apparatus. The communication apparatus includes an input/output interface and a logic circuit.

The input/output interface is configured to receive sixth indication information from a first communication device, where the sixth indication information indicates the communication apparatus to enable or disable an intra-frequency beam.

The logic circuit is configured to enable or disable the intra-frequency beam based on the sixth indication information.

In a possible implementation, the input/output interface is further configured to: send an acknowledgment indication to the first communication device, where the acknowledgment indication indicates that the communication apparatus determines to enable or disable the intra-frequency beam.

A twenty-second aspect of this application provides a communication apparatus, and the communication apparatus includes a processor. The processor is configured to invoke a computer program or computer instructions in a memory, so that the processor implements any implementation of the first aspect to the seventh aspect.

Optionally, the communication apparatus further includes the memory.

Optionally, the memory and the processor are integrated together.

Optionally, the communication apparatus further includes a transceiver, and the processor is configured to control the transceiver to receive and send signals.

A twenty-third aspect of this application provides a computer program product that includes instructions. When the computer program product runs on a computer, the computer is enabled to perform any implementation of the first aspect to the seventh aspect.

A twenty-fourth aspect of this application provides a computer-readable storage medium, including computer instructions. When the instructions are run on a computer, the computer is enabled to perform any implementation of the first aspect to the seventh aspect.

A twenty-fifth aspect of this application provides a chip apparatus, including a processor, configured to invoke a computer program or computer instructions in a memory, so that the processor performs any implementation of the first aspect to the seventh aspect.

Optionally, the processor is coupled to the memory through an interface.

A twenty-sixth aspect of this application provides a communication system. The communication system includes the first communication device according to the first aspect and the second communication device according to the second aspect, or include the first communication device according to the first aspect and the second communication device according to the third aspect.

Optionally, the communication system further includes the third communication device according to the fourth aspect and the fourth communication device according to the fifth aspect.

A twenty-seventh aspect of this application provides a communication system, and the communication system includes the first communication device according to the sixth aspect and the second communication device according to the seventh aspect.

It can be learned from the foregoing technical solutions that embodiments of this application have the following advantages:

It can be learned from the foregoing technical solutions that, the first communication device receives the first signal from the second communication device, and the first band used for communication between the first communication device and the third communication device overlaps the second band used for communication between the second communication device and the fourth communication device. The first communication device adjusts the start moment of the first transmission frame of the first communication device or the end moment of the first transmission frame based on the first signal, where the time interval between the adjusted start moment of the first transmission frame and the start moment of the second transmission frame of the second communication device falls within the interval from $T_1-T_2$ to $T_1+T_2$, and/or the time interval between the adjusted end moment of the first transmission frame and the end moment of the second transmission frame falls within the interval from $T_1-T_3$ to $T_1+T_3$; and $T_1$ is equal to 0 or the timing advance TA, $T_2$ is the first threshold, and $T_3$ is the second threshold. It can be learned that the first communication device adjusts the start moment of the first transmission frame or the end moment of the first transmission frame based on the first signal, so that the time interval between the adjusted start moment of the first transmission frame and the start moment of the second transmission frame of the second communication device falls within the specific interval, and/or the time interval between the adjusted end moment of the first transmission frame and the end moment of the second transmission frame falls within the specific interval. Therefore, interference coordination is facilitated between the first communication device and the second communication device, to alleviate or avoid co-channel coverage interference between the first communication device and the second communication device. In this way, the first communication device and the second communication device provide the communication services for the terminal device in co-channel coverage. It can be learned that, in the technical solutions of this application, the protection area does not need to be set to resolve the problem that the first communication device and the second communication device cannot provide the services for the terminal device in the protection area.

DETAILED DESCRIPTION OF ILLUSTRATIVE EMBODIMENTS

Figure 1:
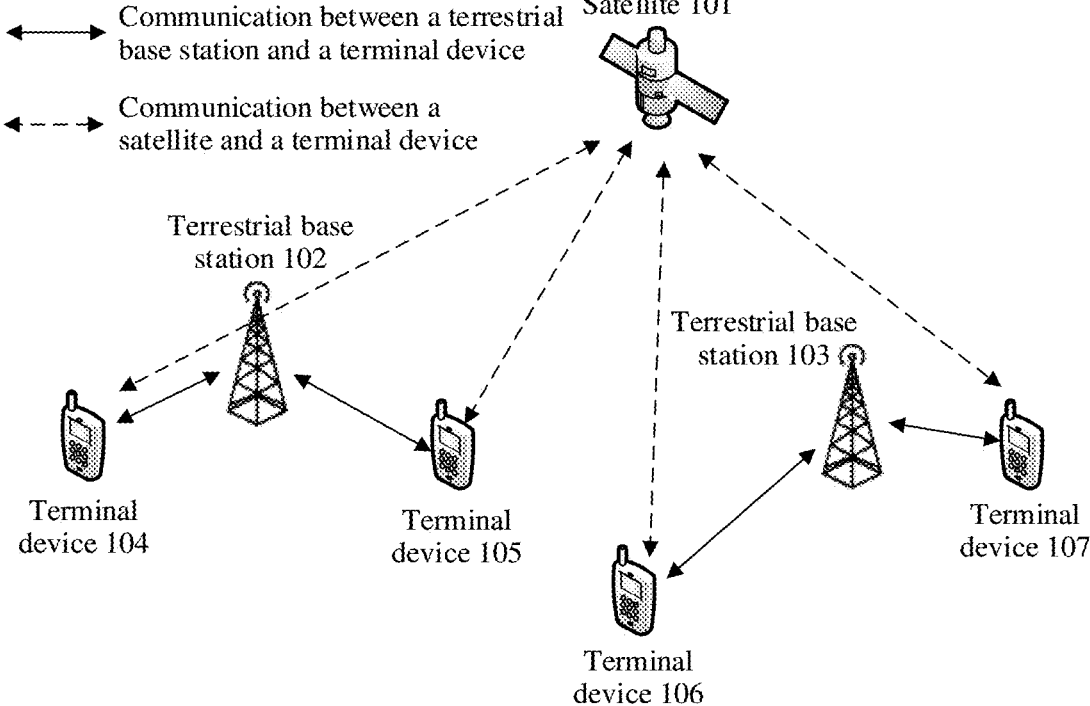
FIG. 1 is a schematic diagram of a communication system according to an embodiment of this application.

Embodiments of this application provide a communication method and a communication apparatus, so that a first communication device adjusts a start moment of a first transmission frame of the first communication device or an end moment of the first transmission frame based on a first signal. Therefore, interference coordination or coordinated transmission is facilitated between the first communication device and a second communication device, to alleviate or avoid co-channel coverage interference between the first communication device and the second communication device. In this way, the first communication device and the second communication device provide communication services for a terminal device in co-channel coverage. Therefore, in technical solution of this application, a protection area does not need to be set to resolve a problem that the first communication device and the second communication device cannot provide services for a terminal device in the protection area.

The following clearly and completely describes the technical solutions in embodiments of this application with reference to accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

Reference to "one embodiment" or "some embodiments" described in this specification means that a specific characteristic, structure or feature described in combination with this embodiment is included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, "at least one" means one or more, and "a plurality of" means two or more. The term "and/or" is an association relationship for describing associated objects and represents that three relationships may exist. For example, A and/or B may represent the following three cases: Only A exists, both A and B exist, and only B exists. A and B may be singular or plural. "At least one item (piece) of the following" or a similar expression thereof means any combination of these items, including a singular item (piece) or any combination of plural items (pieces). For example, at least one of a, b, or c may indicate: a, b, c, a-b, a-c, b-c, or a-b-c, where a, b, and c may be singular or plural.

The technical solutions of this application may be applied to a wireless communication system. The wireless communication system is a wireless communication system in which a conventional mobile communication system integrates a satellite communication system. For example, the mobile communication system may include but is not limited to a narrowband internet of things (NB-IoT) system, a global system for mobile communications (GSM), an enhanced data rates for GSM evolution (enhanced data rates for GSM Evolution, EDGE) system, a wideband code division multiple access (WCDMA) system, a code division multiple access 2000 (code division multiple access, CDMA2000) system, a time division-synchronous code division multiple access (TD-SCDMA) system, a fourth generation (4th generation, 4G) communication system (for example, a long term evolution (LTE) system), a worldwide interoperability for microwave access (WiMAX) communication system, a fifth generation (5th generation, 5G) communication system (for example, a new radio (NR) system), and a future mobile communication system.

A communication system to which embodiments of this application are applicable includes the first communication device, the second communication device, a third communication device, and a fourth communication device. The first communication device supports access of the third communication device, and provides a communication service for the third communication device. The second communication device supports access of the fourth communication device, and provides a communication service for the fourth communication device. The third communication device and the fourth communication device may be a same device, or may be two different devices.

Optionally, the first communication device may be a terrestrial device. For example, the first communication device may be an evolved nodeB (eNB) in a communication system of a 4G access technology, a next generation nodeB (gNB) in a communication system of a 5G access technology, a transmission reception point (TRP), a relay node, or an access point (AP). Alternatively, the first communication device may be a non-terrestrial device, for example, a high-altitude base station, a low earth orbit base station, or a hot air balloon that may provide a wireless access function for a terminal device. The first communication device may alternatively be an unmanned aerial vehicle, or may be a mobile switching center or a device that undertakes a base station function in device-to-device (Device-to-Device, D2D), vehicle-to-everything (V2X), or machine-to-machine (M2M) communication. Alternatively, the first communication device may be a satellite device. For example, the satellite device may be a low-earth orbit satellite, a medium-earth orbit satellite, or a high-earth orbit satellite.

Optionally, the second communication device may be a satellite device. The third communication device and the fourth communication device may be terminal devices. For example, the first communication device and the second communication device are two satellites in different earth orbits.

The following describes the terminal device in this application.

The terminal device may be a device that provides voice or data connectivity for a user. The terminal device is also referred to as user equipment (UE), or may be referred to as a mobile station, a subscriber unit, a station, terminal equipment (TE), or the like. The terminal device may be a cellular phone, a personal digital assistant (PDA), a wireless modem, a handheld device, a laptop computer, a cordless phone, a wireless local loop (WLL) station, a tablet computer (pad), a vehicle-mounted device, a wearable device, a computing device, an unmanned aerial vehicle, or the like. With development of wireless communication technologies, any device that can access a communication system, communicate with a network side of the communication system, or communicate with another object by using the communication system may be the terminal device in embodiments of this application, for example, a terminal device and a vehicle in intelligent transportation, a household device in a smart household, an electricity meter reading instrument in a smart grid, a voltage monitoring instrument, an environment monitoring instrument, a video surveillance instrument in an intelligent security network, and a cash register.

The following describes the technical solutions of this application by using an example in which the first communication device is a terrestrial base station, the second communication device is a satellite device, the third communication device is a first terminal device, and the fourth communication device is a second terminal device.

FIG. 1 is a schematic diagram of a communication system according to an embodiment of this application. Refer to FIG. 1. The communication system includes one or more satellites, one or more terrestrial base stations, and one or more terminal devices. As shown in FIG. 1, a satellite 101 establishes communication connections to the terminal devices (for example, a terminal device 104, a terminal device 105, a terminal device 106, and a terminal device 107) of the communication system, and provides services for the terminal devices. A terrestrial base station 102 may provide communication services for the terminal device 104 and the terminal device 105.

It should be noted that the communication system shown in FIG. 1 is merely an example. Specifically, the communication system shown in FIG. 1 includes the one or more satellites, the one or more terrestrial base stations, and the one or more terminal devices.

In embodiments of this application, in a possible implementation, a satellite device may use a frequency division duplexing (FDD) system, and an access network device may use a time division duplexing (TDD) system or an FDD system. The following uses an example in which the satellite device uses the FDD system and the access network device uses the TDD system for description.

The following describes the technical solutions of this application with reference to specific embodiments.

Figure 2:
FIG. 2 is a schematic diagram of an embodiment of a communication method according to an embodiment of this application.

FIG. 2 is a schematic diagram of an embodiment of a communication method according to an embodiment of this application. Refer to FIG. 2. The communication method includes the following steps.

201: A second communication device sends a first signal to a first communication device. Correspondingly, the first communication device receives the first signal from the second communication device.

The first signal may be used by the first communication device to perform time-frequency synchronization with the second communication device. For example, the first signal is an SSB, or the first signal is another reference signal.

A first band used for communication between the first communication device and a third communication device overlaps a second band used for communication between the second communication device and a fourth communication device. The third communication device and the fourth communication device may be a same terminal device, or may be different terminal devices.

In a possible implementation, the first band and the second band are completely the same, or the first band and the second band are not completely the same but overlap.

In some implementations, the second communication device sends the first signal to the first communication device by using a third frequency band. The third frequency band and the second band may be a same frequency band, or may not be a same frequency band. This is not specifically limited in this application.

The following describes some possible scenarios in which the first band overlaps the second band.

Scenario 1: The second band is a downlink frequency band used for downlink communication between the second communication device and the fourth communication device, and the downlink frequency band overlaps the first band. The first band includes a downlink frequency band used for downlink communication between the first communication device and the third communication device, and/or an uplink frequency band used for uplink communication between the first communication device and the third communication device.

For example, in the scenario 1, the first communication device is a terrestrial base station, and the second communication device is a satellite device. A downlink frequency band used for downlink communication between the satellite device and a second terminal device is the same as or partially the same as a frequency band used for communication between the terrestrial base station and a first terminal device. For example, the frequency band used for communication between the terrestrial base station and the first terminal device includes an uplink frequency band used for communication between the terrestrial base station and the first terminal device, and/or a downlink frequency band used for communication between the terrestrial base station and the first terminal device. In this case, a satellite downlink signal between the satellite device and the second terminal device and a signal transmitted between the terrestrial base station and the first terminal device interfere with each other.

Scenario 2: The second band is an uplink frequency band used for uplink communication between the second communication device and the fourth communication device, and the uplink frequency band overlaps the first band. The first band includes a downlink frequency band used for downlink communication between the first communication device and the third communication device, and/or an uplink frequency band used for uplink communication between the first communication device and the third communication device.

For example, in the scenario 2, the first communication device is an access network device, and the second communication device is a satellite device. An uplink frequency band used for uplink communication between the satellite device and a second terminal device is the same as or partially the same as a frequency band used for communication between the terrestrial base station and a first terminal device. For example, the frequency band used for communication between the terrestrial base station and the first terminal device includes an uplink frequency band used for communication between the terrestrial base station and the first terminal device, and/or a downlink frequency band used for communication between the terrestrial base station and the first terminal device. In this case, a satellite uplink signal between the satellite device and the second terminal device and a signal transmitted between the terrestrial base station and the first terminal device interfere with each other.

202: The first communication device adjusts a start moment of a first transmission frame of the first communication device or an end moment of the first transmission frame based on the first signal.

A time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$. $T_1$ is equal to 0 or a TA, $T_2$ is a first threshold, and $T_3$ is a second threshold. For the TA, refer to related description below.

The first transmission frame is a transmission frame between the first communication device and the third communication device. The first transmission frame is used to carry uplink data between the first communication device and the third communication device, and/or downlink data between the first communication device and the third communication device. The first transmission frame is transmitted between the first communication device and the third communication device by using a part of the first band or the entire first band.

The second transmission frame is a transmission frame between the second communication device and the fourth communication device. The second transmission frame is used to carry uplink data between the second communication device and the fourth communication device, and/or downlink data between the second communication device and the fourth communication device. The second transmission frame is transmitted between the second communication device and the fourth communication device by using a part of the second band or the entire second band.

In some implementations, a frame structure used for the first transmission frame is the same as a frame structure used for the second transmission frame. For example, a length of the first transmission frame is the same as a length of the second transmission frame.

Optionally, the foregoing step 202 specifically includes step 202a and step 202b.

Step 202a: The first communication device determines the start moment of the second transmission frame or the end moment of the second transmission frame based on the first signal.

For example, the first communication device receives the second transmission frame from the second communication device. The first signal is the SSB of the second communication device. The first communication device receives the SSB from the second communication device. The SSB of the second communication device includes a primary synchronization signal (PSS), a secondary synchronization signal (SSS), and a physical broadcast channel (PBCH). The first communication device searches for and detects a synchronization sequence of the PSS, to implement time-frequency synchronization between the first communication device and the second communication device. The first communication device detects the PBCH in the SSB to determine the start moment and/or the end moment of the second transmission frame.

Specifically, the first communication device performs, by using a local sequence of the first communication device, a related operation on the synchronization sequence of the PSS, to estimate a boundary and a frequency-domain offset of a time-domain symbol in which the PSS is located. In addition, time-frequency synchronization between the first communication device and the second communication device is implemented based on the boundary and the frequency-domain offset of the time-domain symbol. The first communication device demodulates information in the PBCH to obtain a frame number and a half-frame number of the second transmission frame, and an index of the SSB, and calculates a location of the SSB in the second transmission frame based on the information. Then, the first communication device infers the start moment and/or the end moment of the second transmission frame based on the location of the SSB in the second transmission frame.

Step 202b: The first communication device adjusts the start moment of the first transmission frame or the end moment of the first transmission frame based on the start moment of the second transmission frame and/or the end moment of the second transmission frame.

The start moment of the first transmission frame is a start moment at which the first communication device sends or receives the first transmission frame. The end moment of the first transmission frame is an end moment at which the first communication device sends or receives the first transmission frame.

The start moment of the second transmission frame is a start moment at which the first communication device receives the second transmission frame. The end moment of the second transmission frame is an end moment at which the first communication device receives the second transmission frame.

Specifically, the first communication device adjusts the start moment of the first transmission frame or the end moment of the first transmission frame, so that the time interval between the adjusted start moment of the first transmission frame and the start moment of the second transmission frame of the second communication device falls within the interval from $T_1-T_2$ to $T_1+T_2$, and/or the time interval between the adjusted end moment of the first transmission frame and the end moment of the second transmission frame falls within the interval from $T_1-T_3$ to $T_1+T_3$. In other words, the time interval between the adjusted start moment of the first transmission frame and the start moment of the second transmission frame of the second communication device is greater than $T_1-T_2$ and less than $T_1+T_2$, or the time interval between the adjusted start moment of the first transmission frame and the start moment of the second transmission frame of the second communication device is greater than or equal to $T_1-T_2$ and less than or equal to $T_1+T_2$. The time interval between the adjusted end moment of the first transmission frame and the end moment of the second transmission frame is greater than $T_1-T_3$ and less than $T_1+T_3$, or the time interval between the adjusted end moment of the first transmission frame and the end moment of the second transmission frame is greater than or equal to $T_1-T_3$ and less than or equal to $T_1+T_3$.

In a possible implementation, the second band is a frequency band used for downlink communication between the second communication device and the fourth communication device. The first band overlaps the second band, and $T_1$ is equal to 0. The second transmission frame is a downlink frame transmitted between the second communication device and the fourth communication device.

Figure 4:
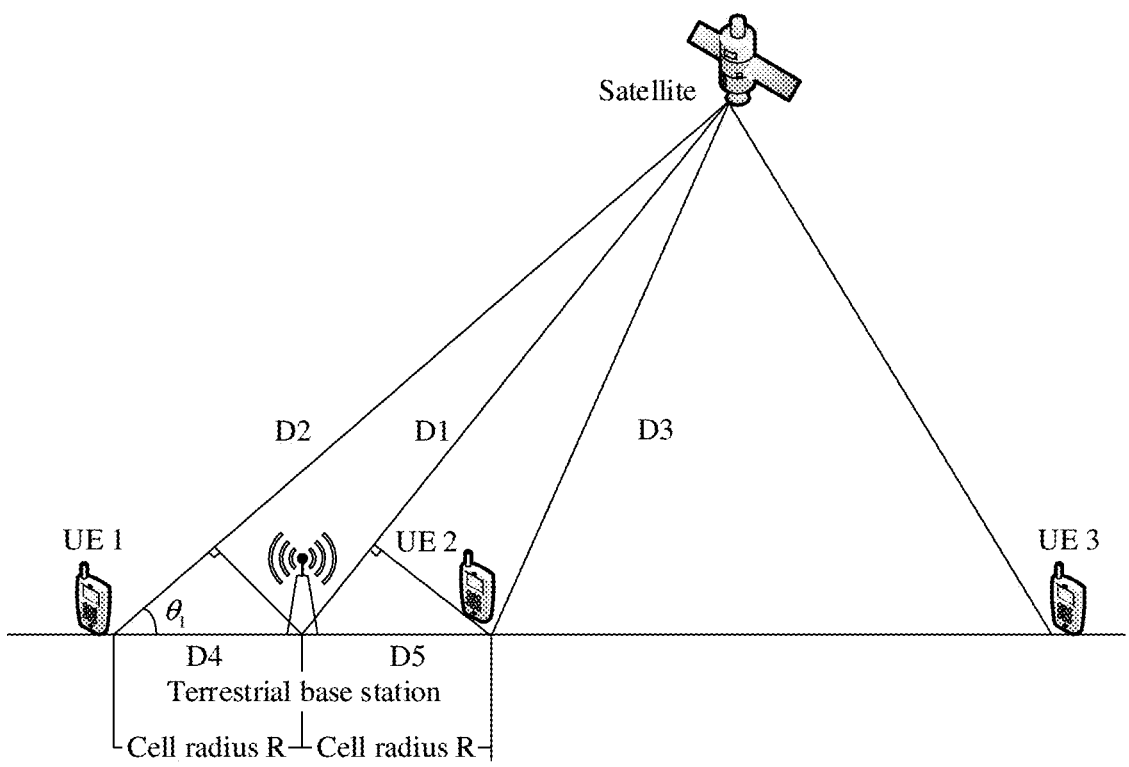
FIG. 4 is a schematic diagram of a scenario for a communication method according to an embodiment of this application.

For example, as shown in FIG. 4, the downlink frequency band used for downlink communication between the satellite device and the second terminal device (for example, a terminal device near UE 1 shown in FIG. 4) is the same as or partially the same as the frequency band used for communication between the terrestrial base station and the first terminal device (for example, the UE 1 shown in FIG. 4). In this case, the satellite downlink signal between the satellite device and the second terminal device and the signal transmitted between the terrestrial base station and the first terminal device interfere with each other. For the second terminal device, the signal transmitted between the terrestrial base station and the first terminal device is an interference signal. For the first terminal device, the satellite downlink signal between the satellite device and the second terminal device is an interference signal. Optionally, the first terminal device and the second terminal device are a same terminal device, in other words, a terminal device establishes connections to both the satellite device and the terrestrial base station, that is, a dual connectivity scenario. In this case, interference may also occur between a satellite downlink signal between the terminal device and the satellite device and a signal between the terminal device and the terrestrial base station.

In this implementation, optionally, the first threshold and the second threshold may be set based on at least one of the following factors: a local oscillator offset between the first communication device and the second communication device, a Doppler effect frequency-domain offset, and synchronization performance. The first threshold and the second threshold may be equal.

Optionally, the synchronization performance includes signal quality of the first signal, a synchronization algorithm, and the like. The start moment of the second transmission frame or the end moment of the second transmission frame that is determined by the first communication device based on the synchronization performance may have a specific offset. Poorer synchronization performance indicates a larger first threshold and a larger second threshold.

A larger local oscillation offset between the first communication device and the second communication device indicates a larger first threshold and a larger second threshold. For example, when the local oscillation offset between the first communication device and the second communication device is 1 ppm (one-millionth), and there is no relative motion, no calculation offset, and no influence of other non-ideal factors between the first communication device and the second communication device, $T2=10$ ms×1 ppm=0.01 μs and $T3=10$ ms×1 ppm=0.01 μs when the first communication device adjusts the first transmission frame every 10 ms (milliseconds), where μs is a microsecond.

Due to the Doppler effect frequency-domain offset, the start moment of the second transmission frame that is determined by the first communication device may be advanced or delayed, or the end moment of the second transmission frame that is determined by the first communication device may be advanced or delayed. A larger Doppler effect frequency-domain offset indicates a larger first threshold and a larger second threshold. For example, when the Doppler effect frequency-domain offset caused by relative motion of the first communication device is 20 ppm, and there is no local oscillation offset, no calculation offset, and no influence of other non-ideal factors between the first communication device and the second communication device, $T2=10$ ms×20 ppm=0.2 μs and $T3=10$ ms×20 ppm=0.2 μs when the first communication device adjusts the first transmission frame every 10 ms.

Optionally, the adjusted start moment of the first transmission frame is aligned with the start moment of the second transmission frame, and/or the adjusted end moment of the first transmission frame is aligned with the end moment of the second transmission frame. In other words, the first threshold is 0, and the second threshold is 0.

Figure 3:
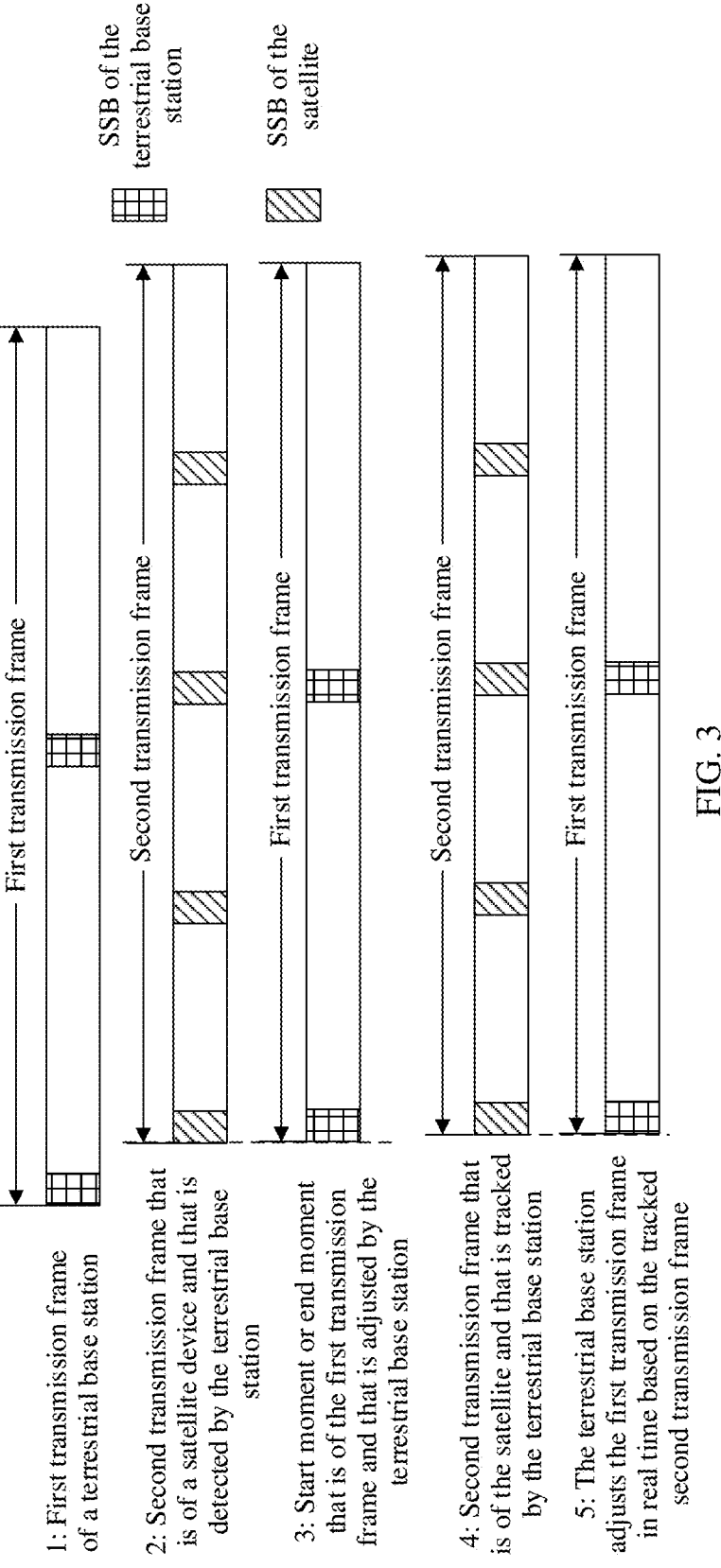
FIG. 3 is a schematic diagram of a first transmission frame and a second transmission frame according to an embodiment of this application.

For example, as shown in FIG. 3, the first communication device is a terrestrial base station, the second communication device is a satellite device, and the third communication device is the first terminal device. The terrestrial base station sends an SSB of the terrestrial base station, and the first transmission frame is transmitted between the terrestrial base station and the first terminal device. The terrestrial base station receives an SSB from the satellite device, and determines the start moment of the second transmission frame or the end moment of the second transmission frame between the satellite device and the second terminal device by using the SSB of the satellite device. Then, the terrestrial base station adjusts the start moment of the first transmission frame or the end moment of the first transmission frame, so that the adjusted start moment of the first transmission frame is aligned with the start moment of the second transmission frame, or the adjusted end moment of the first transmission frame is aligned with the end moment of the second transmission frame.

It should be noted that, in the example shown in FIG. 3, the terrestrial base station sends the SSB of the terrestrial base station by using the first band, and the satellite device sends the SSB of the satellite device by using the second band. In actual application, the terrestrial base station may alternatively send the SSB by using another frequency band, and the satellite device may alternatively send the SSB of the satellite device by using another frequency band. In addition, a location relationship between the SSB of the terrestrial base station and the first transmission frame and a location relationship between the SSB of the satellite device and the second transmission frame in the embodiment shown in FIG. 3 are merely examples, and are not intended to limit this application.

It should be noted that, optionally, a periodicity of the SSB of the satellite device and a periodicity of the SSB of the terrestrial base station may be set to different periodicities, to prevent the terrestrial base station from not detecting the SSB of the satellite device because a moment at which the SSB of the satellite device arrives at the terrestrial base station is exactly a moment at which the terrestrial base station sends the SSB of the terrestrial base station.

For possible interference cases and corresponding interference coordination solutions in the scenario 1, refer to related description below.

It should be noted that, optionally, the first communication device may track the start moment of the second transmission frame and/or the end moment of the second transmission frame in real time or periodically. The first communication device may adjust the start moment of the first transmission frame or the end moment of the first transmission frame in real time or periodically based on the start moment of the second transmission frame and/or the end moment of the second transmission frame.

In another possible implementation, the first band overlaps the second band, and the second band is a frequency band used for uplink communication between the second communication device and the fourth communication device. $T_1$ is equal to the TA, and the second transmission frame is an uplink frame transmitted between the second communication device and the fourth communication device.

For example, as shown in FIG. 4, the uplink frequency band used for uplink communication between the satellite device and the second terminal device is the same as or partially the same as the frequency band used for communication between the terrestrial base station and the first terminal device. In this case, the satellite uplink signal between the satellite device and the second terminal device and the signal transmitted between the terrestrial base station and the first terminal device interfere with each other.

In this implementation, optionally, the first threshold and the second threshold may be set based on at least one of the following factors: local oscillator precision, Doppler effect frequency-domain offsets, synchronization performance, and TA estimation precision that respectively correspond to the first communication device and the second communication device. Higher TA estimation precision indicates a smaller first threshold and a smaller second threshold. The first threshold and the second threshold may be equal. For some example values of the first threshold and the second threshold, refer to the foregoing related descriptions. Details are not described herein again.

In this implementation, optionally, step 202b specifically includes step a and step b.

Step a: The first communication device determines the TA.

Specifically, a value of the TA is equal to a distance difference between the first communication device and the second communication device divided by a speed of light multiplied by 2. For example, as shown in FIG. 4, if the distance difference between the first communication device and the second communication device is D1, TA=2×D1/c, where c is the speed of light.

The following describes two possible implementations in which the first communication device determines the TA. Other implementations are still applicable to this application. This is not specifically limited in this application.

The following describes an implementation 1 with reference to step 2001a. Optionally, before step 202, the embodiment shown in FIG. 2 further includes step 2001a.

Step 2001a: The first communication device receives first indication information from the second communication device, where the first indication information indicates the TA.

For example, as shown in FIG. 4, the first communication device is a terrestrial base station, and the second communication device is a satellite device. The satellite device may determine a location of the terrestrial base station and a location of the satellite device. Then, the satellite device calculates a distance difference between the terrestrial base station and the satellite device. The satellite device calculates the TA based on the distance difference between the terrestrial base station and the satellite device, and indicates the TA to the terrestrial base station.

The following describes an implementation 2 with reference to step 2001b and step 2001C.

Step 2001b: The first communication device obtains ephemeris information of the second communication device.

For example, the first communication device is a terrestrial base station, and the second communication device is a satellite device. In this case, the terrestrial base station obtains ephemeris information of the satellite device.

Step 2001c: The first communication device determines the TA based on the ephemeris information.

For example, the first communication device is a terrestrial base station, and the second communication is a satellite device. In this case, the terrestrial base station determines the location of the satellite device based on the ephemeris information. Then, the terrestrial base station calculates the distance difference between the terrestrial base station and the satellite device based on the location of the satellite device and the location of the terrestrial base station. The terrestrial base station calculates the TA based on the distance difference.

Step b: The first communication device adjusts the start moment of the first transmission frame or the end moment of the first transmission frame based on the value of the TA.

The time interval between the adjusted start moment of the first transmission frame and the start moment of the second transmission frame is time of the TA, and/or the time interval between the adjusted end moment of the first transmission frame and the end moment of the second transmission frame is the time of the TA.

In this implementation, the first communication device adjusts the start moment of the first transmission frame or the end moment of the first transmission frame, so that a moment at which a base station downlink signal between the first communication device and the third communication device arrives at the second communication device is aligned with a moment at which a satellite uplink signal between the second communication device and the fourth communication device arrives at the second communication device. In other words, the base station downlink signal between the first communication device and the third communication device and the satellite uplink signal between the second communication device and the fourth communication device arrive at the second communication device at the same moment.

Figure 5:
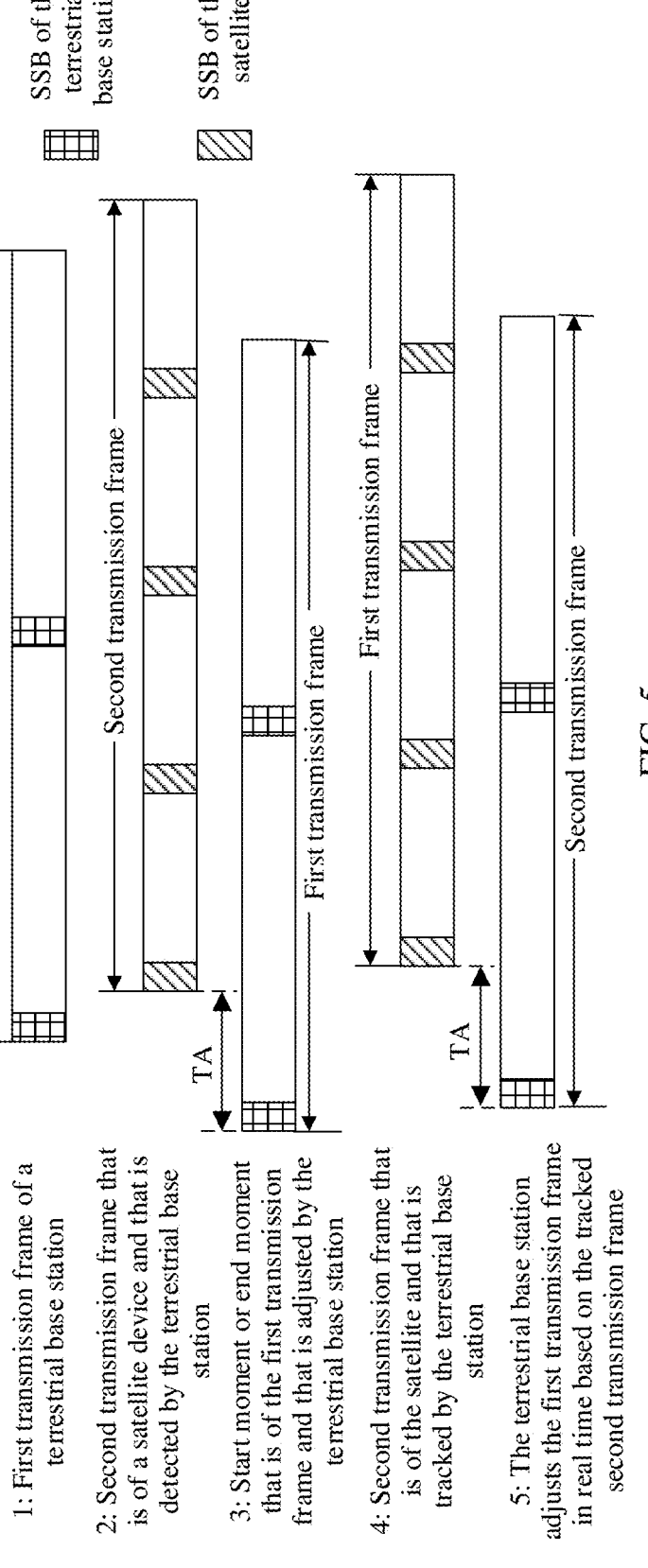
FIG. 5 is another schematic diagram of a first transmission frame and a second transmission frame according to an embodiment of this application.

For example, as shown in FIG. 5, the first communication device is a terrestrial base station, and the second communication device is a satellite device. The terrestrial base station sends an SSB of the terrestrial base station, and the first transmission frame is transmitted between the terrestrial base station and the third communication device (the first terminal device). The terrestrial base station receives an SSB from the satellite device, and determines the start moment of the second transmission frame or the end moment of the second transmission frame between the satellite device and the fourth communication device (the second terminal device) by using the SSB of the satellite device. Then, the terrestrial base station adjusts the start moment of the first transmission frame, so that the adjusted start moment of the first transmission frame is advanced by the time of the TA relative to the start moment of the second transmission frame. Alternatively, the terrestrial base station adjusts the end moment of the first transmission frame, so that the adjusted end moment of the first transmission frame is advanced by the time of the TA relative to the end moment of the second transmission frame. In other words, the terrestrial base station sends the first transmission frame by the time of the TA ahead of the start moment of the second transmission frame, so that the moment at which the base station downlink signal between the first communication device and the third communication device arrives at the second communication device is aligned with the moment at which the satellite uplink signal between the second communication device and the fourth communication device arrives at the second communication device. In other words, the base station downlink signal and the satellite uplink signal arrive at the second communication device at the same moment.

It should be noted that, in the example shown in FIG. 5, the terrestrial base station sends the SSB of the terrestrial base station by using the first band, and the satellite device sends the SSB of the satellite device by using the second band. In actual application, the terrestrial base station may alternatively send the SSB by using another frequency band, and the satellite device may alternatively send the SSB of the satellite device by using another frequency band. In addition, a location relationship between the SSB of the terrestrial base station and the first transmission frame and a location relationship between the SSB of the satellite device and the second transmission frame in the embodiment shown in FIG. 5 are merely examples, and are not intended to limit this application.

It should be noted that, optionally, a periodicity of the SSB of the satellite device and a periodicity of the SSB of the terrestrial base station may be set to different periodicities, to prevent the terrestrial base station from not detecting the SSB of the satellite device because a moment at which the SSB of the satellite device arrives at the terrestrial base station is exactly a moment at which the terrestrial base station sends the SSB of the terrestrial base station.

For possible interference cases and corresponding interference coordination solutions in the scenario 2, refer to related description below.

It should be noted that, optionally, the first communication device may track the start moment of the second transmission frame and/or the end moment of the second transmission frame in real time or periodically. The first communication device may adjust the start moment of the first transmission frame or the end moment of the first transmission frame in real time or periodically based on the start moment of the second transmission frame and/or the end moment of the second transmission frame.

Optionally, the embodiment shown in FIG. 2 further includes step 203 and step 204, and step 203 and step 204 may be performed after step 202.

203: The first communication device sends the TA to the third communication device.

Specifically, the first communication device may indicate the TA to the third communication, so that the third communication device obtains the latest TA used by the first communication device. In this way, the third communication device may implement synchronization with the first communication device in time. The updated TA used by the first communication device does not need to be determined until an SSB of the first communication device is used in a next synchronization periodicity, so that the third communication device receives data from the first communication device.

204: The third communication device adjusts the start moment of the first transmission frame or the end moment of the first transmission frame based on the TA.

Specifically, the third communication device may receive, on a corresponding time-frequency resource in advance of the time of the TA, data carried in the first transmission frame.

In some implementations, the embodiment shown in FIG. 2 further includes step 201a and step 201b, and step 201a and step 201b may be performed before step 201.

201a: The first communication device enables a satellite synchronization mode.

The satellite synchronization module includes: The first communication device monitors the first signal of the second communication device, and adjusts the start moment of the first transmission frame or the end moment of the first transmission frame based on the first signal. In other words, the first communication device starts to perform the solution of step 201 and step 202.

201b: The first communication device sends third indication information to the second communication device, where the third indication information indicates the second communication device to enable the second band. Correspondingly, the second communication device receives the third indication information from the first communication device.

For example, the first communication device is a terrestrial base station, and the second communication device is a satellite device. In this case, the terrestrial base station indicates the satellite device to enable an intra-frequency beam (a beam sampled in the second band), and the satellite device may enable the intra-frequency beam based on the third indication information, to enable the second band.

In this embodiment of this application, the first communication device receives the first signal from the second communication device, and the first band used for communication between the first communication device and the third communication device overlaps the second band used for communication between the second communication device and the fourth communication device. The first communication device adjusts the start moment of the first transmission frame of the first communication device or the end moment of the first transmission frame based on the first signal, where the time interval between the adjusted start moment of the first transmission frame and the start moment of the second transmission frame of the second communication device falls within the interval from $T_1-T_2$ to $T_1+T_2$, and/or the time interval between the adjusted end moment of the first transmission frame and the end moment of the second transmission frame falls within the interval from $T_1-T_3$ to $T_1+T_3$; and $T_1$ is equal to 0 or the TA, $T_2$ is the first threshold, and $T_3$ is the second threshold. It can be learned that the first communication device adjusts the start moment of the first transmission frame or the end moment of the first transmission frame based on the first signal, so that the time interval between the adjusted start moment of the first transmission frame and the start moment of the second transmission frame of the second communication device falls within a specific interval, and/or the time interval between the adjusted end moment of the first transmission frame and the end moment of the second transmission frame falls within a specific interval. Therefore, interference coordination is facilitated between the first communication device and the second communication device, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area. In addition, the first communication device and the second communication device may implement co-channel coverage. Therefore, the terminal device may simultaneously support the services provided by the first communication device and the second communication device. The terminal device does not need to configure a plurality of sets of transceiver hardware, thereby reducing costs of the terminal device.

The following describes some implementations of interference coordination or coordinated transmission between the first communication device and the second communication device with reference to specific scenarios. The following uses two possible scenarios to analyze cases.

Scenario 1: The second band is the downlink frequency band used for downlink communication between the second communication device and the fourth communication device, and the downlink frequency band overlaps the first band.

The first band includes the downlink frequency band used for downlink communication between the first communication device and the third communication device, and/or the uplink frequency band used for uplink communication between the first communication device and the third communication device.

In the scenario 1, the following describes four possible interference cases and corresponding interference coordination solutions or coordinated transmission solutions.

Case 1: A downlink signal between the second communication device and the fourth communication device interferes with a downlink signal between the first communication device and the third communication device.

For example, as shown in FIG. 4, the first communication device is a terrestrial base station, the second communication device is a satellite device, the third communication device is the UE 1, and the fourth communication device is UE 4 (UE near the UE 1, not shown in the figure). For the UE 1, the satellite device sends a satellite downlink signal to the UE 4 at a moment T0, and it can be learned that the satellite downlink signal arrives the UE 1 at a moment T0+D2/c. Because the terrestrial base station adjusts the start moment of the first transmission frame or the end moment of the first transmission frame, the adjusted start moment of the first transmission is aligned with the start moment of the second transmission frame, and/or the adjusted end moment of the first transmission frame is aligned with the end moment of the second transmission frame. In other words, a moment at which the terrestrial base station sends a base station downlink signal is a moment at which the terrestrial base station receives the satellite downlink signal. As shown in FIG. 4, the satellite downlink signal arrives at the terrestrial base station at a moment T0+D1/c. After receiving the satellite downlink signal, the terrestrial base station starts to send a base station downlink signal to the UE 1. In other words, at the moment T0+D1/c, the terrestrial base station sends the base station downlink signal to the UE 1, and the base station downlink signal arrives the UE 1 at a moment T0+(D1+D4)/c, where c is the speed of light.

Therefore, it can be learned that the satellite downlink signal between the satellite device and the UE 4 arrives at the UE 1 earlier than the base station downlink signal between the terrestrial base station and the UE 1. A moment difference between a moment at which the base station downlink signal between the terrestrial base station and the UE 1 arrives at the UE 1 and a moment at which the satellite downlink signal between the satellite device and the UE 4 arrives at the UE 1 is (D1+D4−D2)/c. For the UE 1, as shown in FIG. 4, D4=R, and R is a cell radius. When a value of 01 is close to 0, D1+D4 is close to or equal to D2, in other words, the moment difference (D1+D4−D2)/c between the moment at which base station downlink signal arrives at the UE 1 and the moment at which the satellite downlink signal arrives at the UE 1 is close to or equal to 0. When the value of 01 enables D1 to be close to or equal to D2, D1+D4 is close to or equal to D2+D4, in other words, the moment difference (D1+D4−D2)/c between the moment at which the base station downlink signal arrives at the UE 1 and the moment at which the satellite downlink signal arrives at the UE 1 is close to or equal to R/c. Therefore, the moment difference (D1+D4−D2)/c between the moment at which the base station downlink signal arrives at the UE 1 and the moment at which the satellite downlink signal arrives at the UE 1 is greater than 0 and less than R/c. When the value of $\theta_1$ is close to 180 degrees, D1 is close to D2+D4, and the moment difference between the moment at which the base station downlink signal arrives at the UE 1 and the moment at which the satellite downlink signal arrives at the UE 1 is close to 2D4/c, that is, 2R/c.

It can be learned that a moment difference between a moment at which the downlink signal between the first communication device and the third communication device arrives at the third communication device and a moment at which the downlink signal between the second communication device and the fourth communication device arrives at the third communication device falls within a range of (0, 2R/c). Therefore, interference coordination or coordinated transmission is facilitated between the first communication device and the second communication device, to alleviate or avoid co-channel coverage interference between the first communication device and the second communication device.

Figures 6, 7:
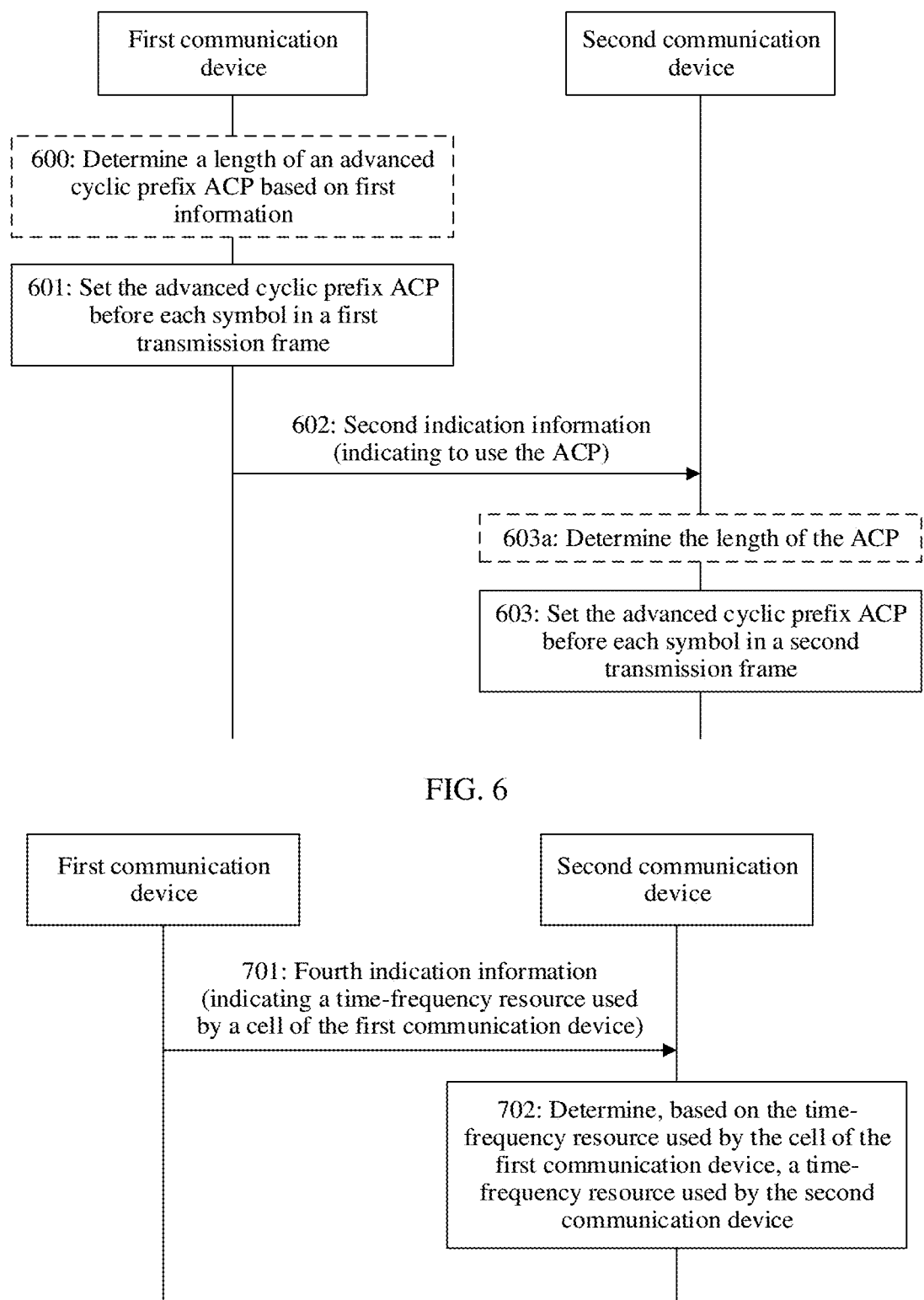
FIG. 6 is a schematic diagram of another embodiment of a communication method according to an embodiment of this application.
FIG. 7 is a schematic diagram of another embodiment of a communication method according to an embodiment of this application.

For the case 1, the following describes two possible interference coordination methods with reference to embodiments shown in FIG. 6 and FIG. 7.

FIG. 6 is a schematic diagram of another embodiment of a communication method according to an embodiment of this application. Refer to FIG. 6. The method includes the following steps.

601: A first communication device sets an ACP before each symbol in a first transmission frame.

Specifically, the first communication device sets the ACP before each downlink symbol in the first transmission frame.

At present, a communication system mainly has a CP mode and an ECP mode. An ACP mode is added in this application. Compared with the ACP mode, the CP mode may be referred to as an NCP mode.

In some implementations, a length of the ACP is greater than or equal to a third threshold. The following factors may be considered for a value of the third threshold: a cell radius of the first communication device (terrestrial base station), an angle between a second communication device and the ground, and a value of a subcarrier spacing used by the first communication device.

Several possible implementations of the third threshold are exemplified below.

1. The third threshold is max(NCP, 2R/c), where max (NCP, 2R/c) is a maximum value of an NCP and 2R/c, R is the cell radius of the first communication device, and c is a speed of light.

2. The third threshold is max(extended cyclic prefix ECP, 2R/c), where max(ECP, 2R/c) is a maximum value of an ECP and 2R/c, R is the cell radius of the first communication device, and c is a speed of light.

3. The third threshold is a sum of a length of an NCP and 2R/c.

In the foregoing three implementations, when the length of the ACP is equal to the third threshold, it may be understood that the first communication device sets the length of the ACP based on a case in which a moment difference between a moment at which a downlink signal between the second communication device and a fourth communication device arrives at a third communication device and a moment at which a downlink signal between the first communication device and the third communication device arrives at the third communication device is close to 2R/c.

Optionally, it can be learned from analysis of the foregoing case 1 that the length of the ACP is related to the cell radius of the first communication device (base station) and the angle between the second communication device and the ground. The first communication device may determine the length of the ACP based on the information. In this way, the first communication device sets a proper ACP before each symbol, to ensure data transmission efficiency when interference is avoided or reduced.

Optionally, the embodiment shown in FIG. 6 further includes step 600, and step 600 may be performed before step 601.

600: The first communication device determines the length of the ACP based on first information.

The first information includes at least one of the following: the cell radius R of the first communication device (terrestrial base station), the angle between the second communication device and the ground, and the subcarrier spacing used by the first communication device.

The subcarrier spacing used by the first communication device is used by the first communication device to determine a symbol length. For example, the symbol length is equal to 1/subcarrier spacing. The first communication device determines the length of the ACP based on the cell radius R of the first communication device and the angle between the second communication device and the ground. A sum of a length of the first transmission frame divided by the symbol length and the length of the ACP is equal to an integer. It can be learned that a larger subcarrier spacing used by the first communication device indicates a smaller symbol length, and a larger ratio of the length of the ACP to the symbol length.

The first communication device may preset lengths of the ACP used in different cell radiuses and subcarrier spacings. The following exemplifies a possible implementation: As shown in Table 1, Table 1 s a CP length defined in a current NR standard.

TABLE 1

| Numerology (Numerology) ($\mu$) | Subcarrier spacing SCS (kHz) | Cyclic prefix for long symbols (CP for Long Symbols) | Cyclic Prefix for other symbols (CP for Other Symbols) |
|---|---|---|---|
| 0 | 15 | Symbol index l = 0.7 NCP = 5.2 µs | NCP = 4.69 µs |
| 1 | 30 | Symbol index l = 0.14 NCP = 2.86 µs | NCP = 2.34 µs |
| 2 | 60 | Symbol index l = 0.28 NCP = 1.69 µs ECP = 4.17 µs | NCP = 1.17 µs ECP = 4.17 µs |
| 3 | 120 | Symbol index l = 0.56 NCP = 1.11 µs | NCP = 0.59 µs |
| 4 | 240 | Symbol index l = 0.112 NCP = 0.81 µs | NCP = 0.29 µs |

In this application, the length of the ACP is related to the cell radius R and the angle between the second communication device and the ground. In different subcarrier spacings, ratios of the length of the ACP to the symbol length are also different. As a result, overheads of the ACP are also different. The following uses the cell radius R=200 m and 2R/c=1.33 µs as an example to design a corresponding length of the ACP. Details are shown in table 2:

TABLE 2

| Numerology (Numerology) ($\mu$) | Subcarrier spacing (kilohertz, kHz) | Length of the ACP |
|---|---|---|
| 0 | 15 | ACP = NCP (the NCP can meet a requirement) |
| 1 | 30 | ACP = NCP (the NCP can meet a requirement) |
| 2 | 60 | ACP = ECP (the ECP can meet a requirement, and each slot includes 12 orthogonal frequency division multiplexing (orthogonal frequency division multiplexing, OFDM) symbols), or ACP = 2.56 µs (each slot includes 13 OFDM symbols) |
| 3 | 120 | ACP = 2.09 µs (each slot includes 12 OFDM symbols) |
| 4 | 240 | ACP = 1.52 µs (each slot includes 11 OFDM symbols), or ACP = 2.08 µs (each slot includes 10 OFDM symbols) |

Therefore, if the cell radius used by the first communication device is 200 m, the first communication device may determine the length of the ACP by using Table 2.

It should be noted that the foregoing Table 2 shows a case in which lengths of the ACP set before all symbols are the same. In actual application, lengths of the ACP set before all the symbols may alternatively be different provided that a co-channel interference requirement can be met and the length of the first transmission frame divided by a first average value is equal to an integer. The first average value is an average value of a sum of a symbol length in the first transmission frame and a length of the ACP set before a symbol.

602: The first communication device sends second indication information to the second communication device, where the second indication information indicates to use the ACP.

Specifically, that the first communication device may indicate the second communication device to use the ACP may also be referred to as that the first communication device indicates the second communication device to enable the ACP mode.

Optionally, the second indication information further indicates the length of the ACP. In this implementation, the first communication device may determine the length of the ACP and notify the second communication device of the length in the manner shown in step 60i, so that the second communication device performs the following step 603.

603: The second communication device sets the ACP before each symbol in a second transmission frame.

Specifically, the second communication device sets the ACP before each downlink symbol in the second transmission frame.

Optionally, the embodiment shown in FIG. 6 further includes step 603a, and step 603a may be performed before step 603.

603a: The second communication device determines the length of the ACP.

In a possible implementation, the second indication information further indicates the length of the ACP. The second communication device determines the length of the ACP based on the second indication information.

In another possible implementation, the second communication device obtains the first information, and determines the length of the ACP based on the first information. For the first information, refer to the foregoing related description.

It should be noted that the embodiment shown in FIG. 6 may be performed after the embodiment shown in FIG. 2, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area.

FIG. 7 is a schematic diagram of another embodiment of a communication method according to an embodiment of this application. Refer to FIG. 7. The method includes the following steps.

701: A first communication device sends fourth indication information to a second communication device, where the fourth indication information indicates a time-frequency resource used by a cell of the first communication device.

Specifically, the first communication device may select the time-frequency resource (for example, a downlink time-frequency resource used by the cell of the first communication device) used by the cell of the first communication device, and indicate, to the second communication device, the time-frequency resource used by the cell of the first communication device.

702: The second communication device determines, based on the time-frequency resource used by the cell of the first communication device, a time-frequency resource used by the second communication device.

Optionally, the time-frequency resource used by the cell of the first communication device includes the downlink time-frequency resource used by the cell of the first communication device, that is, a downlink time-frequency resource used for downlink communication between the first communication device and a third communication device. The time-frequency resource used by the cell of the first communication device includes a downlink time-frequency resource used for downlink communication between the second communication device and a fourth communication device.

In some implementations, the time-frequency resource used by the second communication device does not overlap the time-frequency resource used by the cell of the first communication device. Alternatively, the time-frequency resource used by the second communication device and the time-frequency resource used by the cell of the first communication device are separated by a guard band of a first length in frequency domain.

In other words, the second communication device determines, based on the downlink time-frequency resource used by the cell of the first communication device, a downlink time-frequency resource used by the second communication device, so that the downlink time-frequency resource used by the second communication device does not overlap the downlink time-frequency resource used by the cell of the first communication device, or a sufficient guard band is reserved between the downlink time-frequency resource used by the second communication device and the downlink time-frequency resource used by the cell of the first communication device. A size of the guard band may be set based on a moment difference between a moment at which a downlink signal between the first communication device and the third communication device arrives at the third communication device and a moment at which a downlink signal between the second communication device and the fourth communication device arrives at the third communication device. A larger moment difference indicates a larger guard band. This reduces influence of interference. Optionally, the first communication device and the second communication device may further reduce the influence of interference in a manner of waveform acceleration out-of-band attenuation, for example, subband-based filtered orthogonal frequency division multiplexing (F-OFDM).

It should be noted that the embodiment shown in FIG. 7 may be performed after the embodiment shown in FIG. 2, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area.

It should be noted that the embodiment shown in FIG. 7 shows a manner in which the first communication device indicates, to the second communication device, the time-frequency resource used by the cell of the first communication device. In actual application, the second communication device may alternatively send, to the first communication device, the time-frequency resource used by the second communication device. Then, the first communication device determines, based on the time-frequency resource used by the second communication device, the time-frequency resource used by the cell of the first communication device. This is not specifically limited in this application.

Case 2: The downlink signal between the first communication device and the third communication device interferes with the downlink signal between the second communication device and the fourth communication device.

For example, as shown in FIG. 4, it can be learned from analysis similar to the case 1 that a moment difference between a moment at which a satellite downlink signal between a satellite device and UE 4 arrives at the UE 4 and a moment at which a base station downlink signal between a terrestrial base station and UE 1 arrives at the UE 4 falls within a range of (−2R/c, 0), where c is a speed of light. For UE 3, because the UE 3 is not in a service area of the terrestrial base station, the UE 3 is not interfered by the base station.

It can be learned that, for the case 2, a moment difference between a moment at which the downlink signal between the second communication device and the fourth communication device arrives at the fourth communication device and a moment at which the downlink signal between the first communication device and the third communication device arrives at the fourth communication device falls within the range of (−2R/c, 0). Therefore, interference coordination or coordinated transmission is facilitated between the first communication device and the second communication device, to alleviate or avoid co-channel coverage interference between the first communication device and the second communication device.

For the case 2, an interference coordination method used between the first communication device and the second communication device is similar to an interference coordination method between the first communication device and the second communication device in the case 1. For details, refer to the related descriptions in the embodiments shown in FIG. 6 and FIG. 7. Details are not described herein again.

Case 3: The downlink signal between the second communication device and the fourth communication device interferes with an uplink signal between the first communication device and the third communication device.

For the case 3, the first communication device and the second communication device may avoid co-channel interference by negotiating an uplink time-frequency resource used by the first communication device and the downlink time-frequency resource used by the second communication device. For example, the uplink time-frequency resource used by the first communication device is orthogonal to the downlink time-frequency resource used by the second communication device. For example, the uplink time-frequency resource used by the first communication device and the downlink time-frequency resource used by the second communication device are separated by a guard band of a specific length.

Case 4: An uplink signal between the first communication device and the third communication device interferes with the downlink signal between the second communication device and the fourth communication device.

For example, the first communication device is a terrestrial base station, the second communication device is a satellite device, the third communication device is UE 1, and the fourth communication device is UE 4 (UE near the UE 1, not shown in the figure). Because the satellite device is synchronized with the UE 1, the terrestrial base station is synchronized with the UE 4 (the UE near the UE 1). The terrestrial base station adjusts a start moment of a first transmission frame or an end moment of the first transmission frame by using the embodiment shown in FIG. 2, so that an adjusted start moment of the first transmission is aligned with a start moment of a second transmission frame, and/or an adjusted end moment of the first transmission frame is aligned with an end moment of the second transmission frame. The satellite device sends a satellite downlink signal to the UE 4 at a moment T0. A moment at which the satellite downlink signal arrives at the UE 4 is T0+D2/c. A moment at which a satellite signal arrives at the terrestrial base station is T0+D1/c. Because a base station uplink signal sent by the UE 1 to the terrestrial base station needs to arrive at the terrestrial base station at T0+D1/c, the UE 1 needs to send the base station uplink signal at a moment T0+D1/c−D4/c. Because the UE 1 is close to the UE 4, a moment at which the base station uplink signal sent by the UE 1 arrives at the UE 4 may be almost understood as the moment T0+D1/c−D4/c. It can be learned that the base station uplink signal arrives at the UE 4 earlier than the satellite downlink signal. Therefore, a moment difference between the moment at which the satellite downlink signal arrives at the UE 4 and the moment at which the base station uplink signal arrives at the UE 4 is (D2−D1+D4)/c. Similar to analysis of the foregoing case 1, the moment difference between the moment at which the satellite downlink signal arrives at the UE 4 and the moment at which the base station uplink signal arrives at the UE 4 falls within a range of (0, 2R/c).

It can be learned that, for the case 4, the uplink signal between the first communication device and the third communication device arrives at the fourth communication device earlier than the downlink signal between the second communication device and the fourth communication device. In the case 4, a moment difference between a moment at which the downlink signal between the second communication device and the fourth communication device arrives at the fourth communication device and a moment at which the uplink signal between the first communication device and the third communication device arrives at the fourth communication device falls within the range of (0, 2R/c). Therefore, interference coordination or coordinated transmission is facilitated between the first communication device and the second communication device, to alleviate or avoid co-channel coverage interference between the first communication device and the second communication device.

Figure 8:
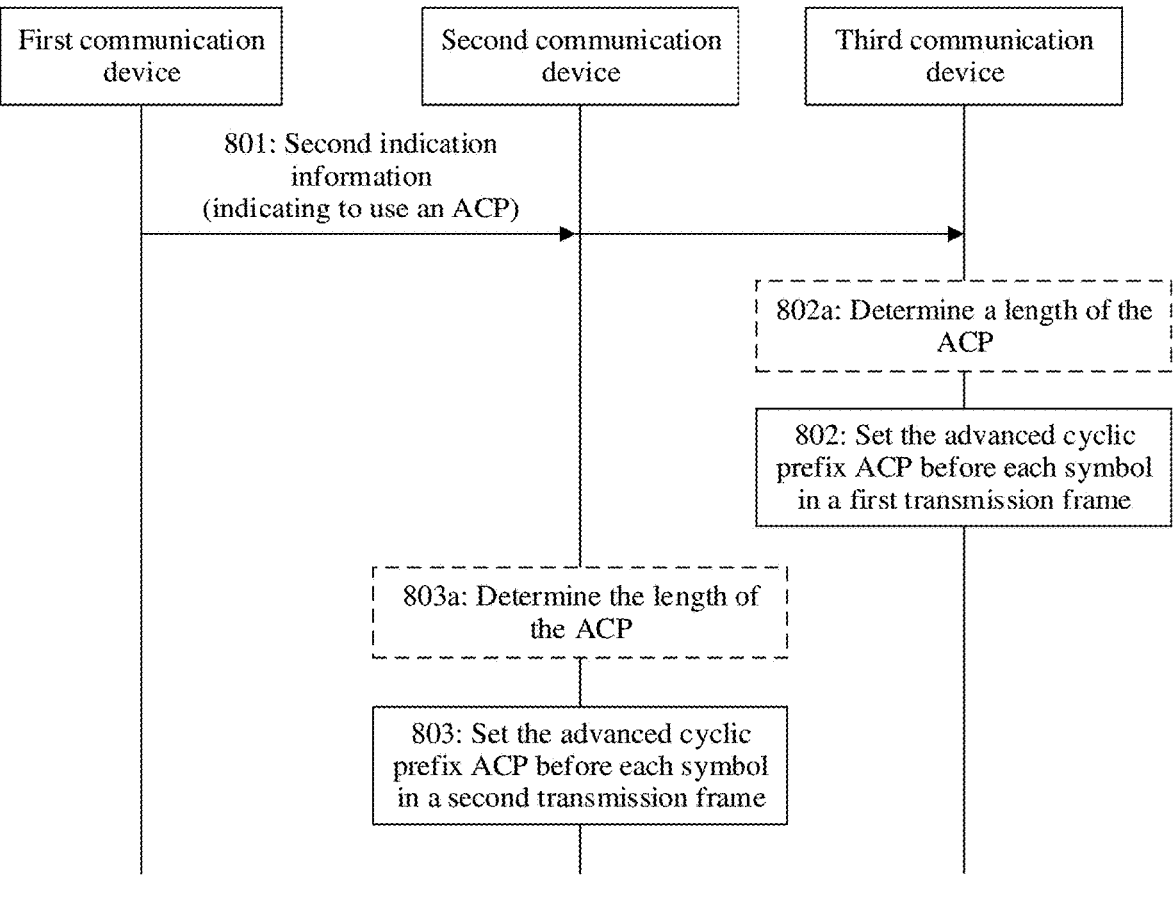
FIG. 8 is a schematic diagram of another embodiment of a communication method according to an embodiment of this application.

For the case 4, the following describes a possible interference coordination method with reference to an embodiment shown in FIG. 8.

FIG. 8 is another possible implementation of a communication method according to an embodiment of this application. Refer to FIG. 8. The method includes the following steps.

801: A first communication device sends second indication information to a second communication device and a third communication device, where the second indication information indicates to use an ACP. For the second indication information, refer to the related description of step 601 in the embodiment shown in FIG. 6. Details are not described herein again.

802: The third communication device sets the ACP before each symbol in a first transmission frame.

Specifically, the third communication device sets the ACP before each uplink symbol in the first transmission frame.

Optionally, the embodiment shown in FIG. 8 further includes step 802a, and step 802a may be performed before step 802.

802a: The third communication device determines a length of the ACP.

Step 802a is similar to a determining process in which the second communication device determines the length of the ACP in step 603a in the embodiment shown in FIG. 6. For details, refer to the related descriptions of step 603a in the embodiment shown in FIG. 6.

803: The second communication device sets the ACP before each symbol in a second transmission frame.

Step 803 is similar to step 603 in the embodiment shown in 6. For details, refer to the related descriptions of step 603 in the embodiment shown in FIG. 6. Details are not described herein again.

Optionally, the embodiment shown in FIG. 8 further includes step 803a, and step 803a may be performed before step 803.

803a: The second communication device determines the length of the ACP. Step 803a is similar to step 603a in the embodiment shown in FIG. 6. For details, refer to the related descriptions of step 603a in the embodiment shown in FIG. 6.

It should be noted that there is no fixed execution sequence between step 802a and step 802 and step 803a and step 803. Step 802a and step 802 may be performed first, and then step 803a and step 803 are performed. Alternatively, step 803a and step 803 are performed first, and then step 802a and step 802 are performed. Alternatively, step 802a and step 802 and step 803a and step 803 are simultaneously performed based on a situation. This is not specifically limited in this application.

It should be noted that the embodiment shown in FIG. 8 may be performed after the embodiment shown in FIG. 2, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area.

Optionally, interference coordination may be alternatively performed between the first communication device and the second communication device by using a method similar to that shown in FIG. 7. Specifically, the first communication device indicates, to the second communication device by using indication information, an uplink time-frequency resource used by a cell of the first communication device. Then, the second communication device can determine, based on the uplink time-frequency resource used by the cell of the first communication device, a downlink time-frequency resource used by the second communication device.

The uplink time-frequency resource used by the cell of the first communication device does not overlap the downlink time-frequency resource used by the second communication device, or there is a corresponding guard band between the uplink time-frequency resource used by the cell of the first communication device and the downlink time-frequency resource used by the second communication device. A size of the guard band may be set based on a moment difference between a moment at which a downlink signal between the second communication device and a fourth communication device arrives at the fourth communication device and a moment at which an uplink signal between the first communication device and the third communication device arrives at the fourth communication device. A larger moment difference indicates a larger guard band. In other words, influence of interference is reduced by negotiating the time-frequency resources used by the first communication device and the second communication device, to ensure that no base station uplink user near a user that receives a satellite downlink signal performs transmission by using a similar or same time-frequency resource. An interference coordination process between the first communication device and the second communication device may be performed after the embodiment shown in FIG. 2, to alleviate or avoid co-channel coverage interference between the first communication device and the second communication device. In this way, the first communication device and the second communication device provide the communication services for the terminal device in co-channel coverage. It can be learned that, in the technical solution of this application, the protection area does not need to be set to resolve the problem that the first communication device and the second communication device cannot provide the services for the terminal device in the protection area.

The foregoing cases 1 to 4 are solutions for analyzing possible interference cases and corresponding interference protocols. In actual application, there may be one case shown above, or there may be a plurality of cases shown above at the same time.

Scenario 2: The second band is an uplink frequency band used for uplink communication between the second communication device and the fourth communication device, and the uplink frequency band overlaps the first band.

The first band includes a downlink frequency band used for downlink communication between the first communication device and the third communication device, and an uplink frequency band used for uplink communication between the first communication device and the third communication device.

In the scenario 2, the following describes four possible interference cases and corresponding interference coordination solutions or coordinated transmission methods.

Case A: The uplink signal between the first communication device and the third communication device interferes with an uplink signal between the second communication device and the fourth communication device.

For example, as shown in FIG. 4, the first communication device is a terrestrial base station, the second communication device is a satellite device, the third communication device is UE 1, and the fourth communication device is UE 4 (UE near the UE 1, not shown in the figure). The UE 4 is synchronized with the satellite device. The satellite device sends the second transmission frame at a moment T0. For the UE 4, to ensure a satellite uplink signal of the UE 4 arrives at the satellite device at the moment T0, the UE 4 should send the satellite uplink signal at a moment $T0-(D2/c)$. The terrestrial base station adjusts a start moment of the first transmission frame or an end moment of the first transmission frame, so that a base station downlink signal of the terrestrial base station also arrives at the satellite device at the moment T0, in other words, the terrestrial base station needs to send the base station downlink signal at a moment T0−(D1/c). The UE 1 near the UE 4 is synchronized with the terrestrial base station. Therefore, the UE 1 should send a base station uplink signal at a moment T0−((D1+D4)/c), so that the base station uplink signal arrives at the terrestrial base station at the moment T0−(D1/c). In this case, it can be learned that a moment difference between a moment at which the satellite uplink signal sent by the UE 4 arrives at the satellite device and a moment at which the base station uplink signal sent by the UE 1 arrives at the satellite device is ((D1+D4)−D2)/c. For the UE 4, as shown in FIG. 4, D4=R, and R is a cell radius. When a value of $\theta_1$ is close to 0, D1+D4 is close to or equal to D2, in other words, the moment difference ((D1+D4)−D2)/c between the moment at which the satellite uplink signal sent by the UE 4 arrives at the satellite device and the moment at which the base station uplink signal sent by the UE 1 arrives at the satellite device is close to or equal to 0. When the value of $\theta_1$ enables D1 to be close to or equal to D2, D1+D4 is close to or equal to D2+D4, in other words, the moment difference ((D1+D4)−D2)/c between the moment at which the satellite uplink signal sent by the UE 4 arrives at the satellite device and the moment at which the base station uplink signal sent by the UE 1 arrives at the satellite device is close to or equal to R/c. When the value of 01 is close to 180 degrees, the moment difference ((D1+D4)−D2)/c between the moment at which the satellite uplink signal sent by the UE 4 arrives at the satellite device and the moment at which the base station uplink signal sent by the UE 1 arrives at the satellite device is close to or equal to 2R/c. Therefore, the moment difference ((D1+D4)−D2)/c between the moment at which the satellite uplink signal sent by the UE 4 arrives at the satellite device and the moment at which the base station uplink signal sent by the UE 1 arrives at the satellite device is greater than 0 and less than 2R/c.

It can be learned that, in the case A, the uplink signal between the first communication device and the third communication device arrives at the second communication device earlier than the uplink signal between the second communication device and the fourth communication device. A moment difference between a moment at which the uplink signal between the second communication device and the fourth communication device arrives at the second communication device and a moment at which the uplink signal between the first communication device and the third communication device arrives at the second communication device is greater than 0 and less than 2R/c, in other words, the moment difference falls within a range of (0, 2R/c). Therefore, interference coordination or coordinated transmission is facilitated between the first communication device and the second communication device, to alleviate or avoid co-channel coverage interference between the first communication device and the second communication device.

Figure 9:
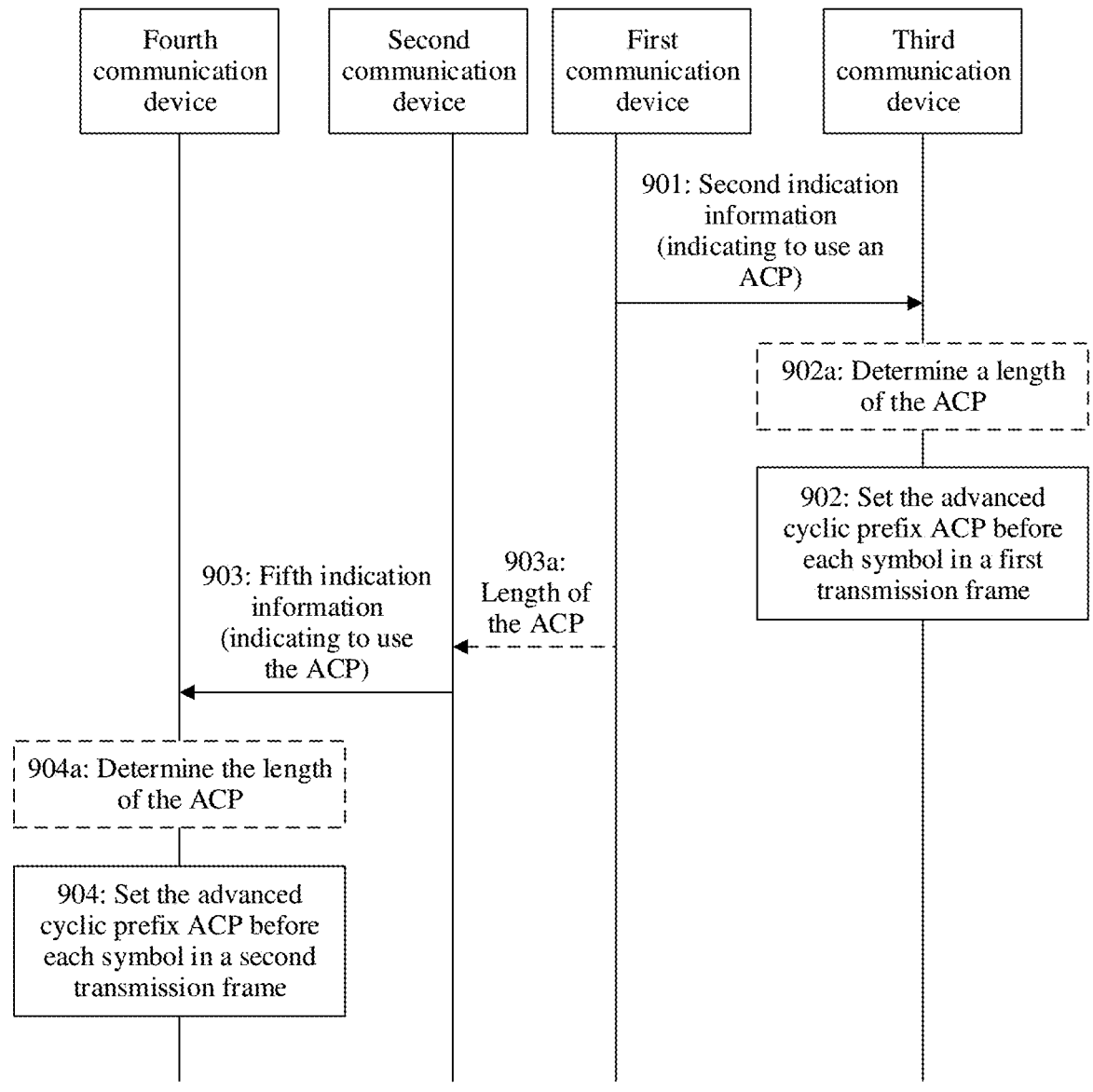
FIG. 9 is a schematic diagram of another embodiment of a communication method according to an embodiment of this application.

For the case A, the following describes a possible interference coordination method with reference to an embodiment shown in FIG. 9.

FIG. 9 is a schematic diagram of another embodiment of a communication method according to an embodiment of this application. Refer to FIG. 9. The method includes the following steps.

901: A first communication device sends second indication information to a third communication device, where the second indication information indicates to use an ACP.

Optionally, the second indication information further indicates a length of the ACP. For related descriptions of the second indication information, refer to the related descriptions of step 602 in the embodiment shown in FIG. 6. Details are not described herein again.

902: The third communication device sets the ACP before each symbol in a first transmission frame.

Specifically, the third communication device sets the ACP before each uplink symbol in the first transmission frame.

Optionally, the embodiment shown in FIG. 9 further includes step 902a, and step 902a may be performed before step 902.

902a: The third communication device determines the length of the ACP.

Step 902a is similar to a manner in which the second communication device determines the length of the ACP in step 603a in the embodiment shown in FIG. 6. For details, refer to the related descriptions of step 603a in the embodiment shown in FIG. 6. Details are not described herein again.

903: The second communication device sends fifth indication information to the fourth communication device, where the fifth indication information indicates to use the ACP.

Optionally, the fifth indication information further indicates the length of the ACP. The fifth indication information is similar to the foregoing second indication information. For details, refer to the foregoing related descriptions.

Specifically, the second communication device may determine the length of the ACP, and send the length of the ACP to the fourth communication device by using the fifth indication information.

Optionally, the following describes two possible implementations in which the second communication device determines the length of the ACP.

Implementation 1

The following describes the implementation 1 with reference to step 903a.

Optionally, the embodiment shown in FIG. 9 further includes step 903a, and step 903a may be performed before step 903.

903a: The second communication device receives the length of the ACP from the first communication device.

In the implementation 1, the first communication device indicates the length of the ACP to the second communication device, so that the second communication device indicates the length of the ACP to the fourth communication device.

Implementation 2: The second communication device determines the length of the ACP based on first information. The implementation 2 is similar to step 600 in the embodiment shown in FIG. 6. For details, refer to related descriptions of step 600 in the embodiment shown in FIG. 6.

904: The fourth communication device sets the ACP before each symbol in a second transmission frame.

Specifically, the fourth communication device sets the ACP before each uplink symbol in the second transmission frame.

It should be noted that the embodiment shown in FIG. 9 may be performed after the embodiment shown in FIG. 2, to alleviate or avoid co-channel coverage interference between the first communication device and the second communication device. In this way, the first communication device and the second communication device provide communication services for a terminal device in co-channel coverage. It can be learned that, in the technical solution of this application, a protection area does not need to be set to resolve a problem that the first communication device and the second communication device cannot provide services for a terminal device in the protection area.

Optionally, interference coordination may be alternatively performed between the first communication device and the second communication device by using a method similar to that shown in FIG. 7. Specifically, the first communication device indicates, to the second communication device by using indication information, an uplink time-frequency resource used by a cell of the first communication device. Then, the second communication device can determine, based on the uplink time-frequency resource used by the cell of the first communication device, an uplink time-frequency resource used by the second communication device.

The uplink time-frequency resource used by the cell of the first communication device does not overlap the uplink time-frequency resource used by the second communication device, or there is a corresponding guard band between the uplink time-frequency resource used by the cell of the first communication device and the uplink time-frequency resource used by the second communication device. A length of the guard band may be set based on a moment difference between a moment at which an uplink signal between the second communication device and the fourth communication device arrives at the second communication device and a moment at which an uplink signal between the first communication device and the third communication device arrives at the second communication device. In other words, influence of interference is reduced by negotiating time-frequency resources used by the first communication device and the second communication device. An interference coordination process between the first communication device and the second communication device may be performed after the embodiment shown in FIG. 2, to alleviate or avoid co-channel coverage interference between the first communication device and the second communication device. In this way, the first communication device and the second communication device provide the communication services for the terminal device in co-channel coverage. It can be learned that, in the technical solution of this application, the protection area does not need to be set to resolve the problem that the first communication device and the second communication device cannot provide the services for the terminal device in the protection area.

Case B: The uplink signal between the second communication device and the fourth communication device interferes with the uplink signal between the first communication device and the third communication device.

For example, as shown in FIG. 4, it can be learned from analysis similar to the foregoing case A that a moment difference between a moment at which a base station uplink signal between a terrestrial base station and UE 1 arrives at the terrestrial base station and a moment at which a satellite uplink signal between a satellite device and UE 4 arrives at the terrestrial base station falls within a range of (−2R/c, 0).

It can be learned that, for the case B, a moment difference between a moment at which the uplink signal between the first communication device and the third communication device arrives at the first communication device and a moment at which the uplink signal between the second communication device and the fourth communication device arrives at the first communication device falls within the range of (−2R/c, 0). Therefore, interference coordination or coordinated transmission is facilitated between the first communication device and the second communication device, to alleviate or avoid co-channel coverage interference between the first communication device and the second communication device.

For the case B, an interference coordination method used between the first communication device and the second communication device is similar to an interference coordination method between the first communication device and the second communication device in the foregoing case A. For details, refer to the related descriptions of the interference coordination method in the case A. Details are not described herein again.

Case C: A downlink signal between the first communication device and the third communication device interferes with the uplink signal between the second communication device and the fourth communication device.

For the case C, the first communication device and the second communication device may avoid co-channel interference by negotiating the downlink time-frequency resource used by the first communication device and an uplink time-frequency resource used by the second communication device. For example, the downlink time-frequency resource used by the first communication device is orthogonal to the uplink time-frequency resource used by the second communication device. Alternatively, a corresponding guard band is reserved between the downlink time-frequency resource used by the first communication device and the uplink time-frequency resource used by the second communication device.

Case D: The uplink signal between the second communication device and the fourth communication device interferes with a downlink signal between the first communication device and the third communication device.

For example, as shown in FIG. 4, the first communication device is a terrestrial base station, the second communication device is a satellite device, the third communication device is UE 1, and the fourth communication device is UE 4 (UE near the UE 1, not shown in the figure). The UE 4 is synchronized with the satellite device. The satellite device sends the second transmission frame at a moment T0. The terrestrial base station adjusts a start moment of the first transmission frame or an end moment of the first transmission frame, so that a base station downlink signal of the terrestrial base station also arrives at the satellite device at the moment T0. In other words, the terrestrial base station should send the base station downlink signal at a moment T0−(D1/c), so that the base station downlink signal between the terrestrial base station and the UE 1 arrives at the satellite device at the moment T0. Therefore, it can be learned that a moment at which the base station downlink signal arrives at the UE 1 is T0−(D1+D4)/c. The UE 4 is synchronized with the satellite device. To ensure that a satellite uplink signal between the satellite device and the UE 4 arrives at the satellite device at the moment T0, the UE 4 should send the satellite uplink signal at a moment T0−(D2/c). Because the UE 1 is close to the UE 4, a moment at which the satellite uplink signal sent by the UE 4 arrives at the UE 1 may almost be understood as a moment at which the UE 4 sends the satellite device, that is, the moment T0−(D2/c). It can be learned that the base station uplink signal arrives at the UE 1 earlier than the satellite downlink signal. Therefore, a moment difference between a moment at which the satellite downlink signal arrives at the UE 1 and a moment at which the base station uplink signal arrives at the UE 1 is (D2−D1+D4)/c. Similar to analysis of the foregoing case 1, the moment difference between the moment at which the satellite downlink signal arrives at the UE 1 and the moment at which the base station uplink signal arrives at the UE 1 falls within a range of (0, 2R/c).

It can be learned that, for the case D, the downlink signal between the first communication device and the third communication device arrives at the third communication device earlier than the uplink signal between the second communication device and the fourth communication device. A moment difference between a moment at which the uplink signal between the second communication device and the fourth communication device arrives at the third communication device and a moment at which the downlink signal between the first communication device and the third communication device arrives at the third communication device falls within the range of (0, 2R/c). Therefore, interference coordination or coordinated transmission is facilitated between the first communication device and the second communication device, to alleviate or avoid co-channel coverage interference between the first communication device and the second communication device. In this way, the first communication device and the second communication device provide the communication services for the terminal device in co-channel coverage.

Figure 10:
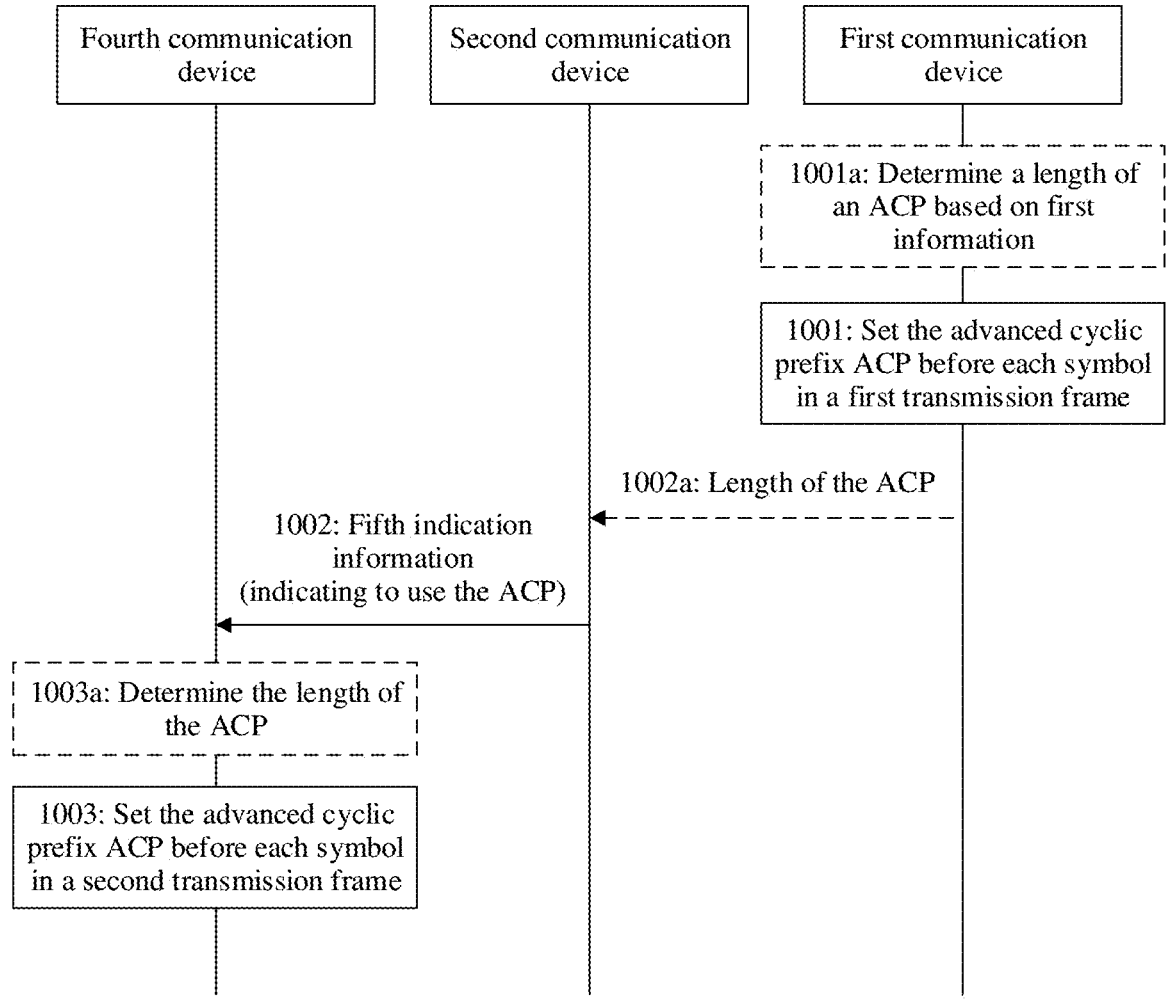
FIG. 10 is a schematic diagram of another embodiment of a communication method according to an embodiment of this application.

For the case D, the following describes a possible implementation with reference to an embodiment shown in FIG. 10.

FIG. 10 is a schematic diagram of another embodiment of a communication method according to an embodiment of this application. Refer to FIG. 10. The method includes the following steps.

1001: A first communication device sets an ACP before each symbol in a first transmission frame.

Optionally, the embodiment shown in FIG. 10 further includes step 1000, and step 1000 may be performed before step 1001.

Step 1000 and step 1001 are similar to step 600 and step 601 in the embodiment shown in FIG. 6. For details, refer to the related descriptions of step 600 and step 601 in the embodiment shown in FIG. 6. Details are not described herein again.

1002: A second communication device sends fifth indication information to a fourth communication device, where the fifth indication information indicates to use the ACP.

Optionally, the embodiment shown in FIG. 10 further includes step 1002a, and step 1002a may be performed before step 1002.

1002a: The first communication device sends a length of the ACP to the second communication device.

1003: The fourth communication device sets the ACP before each symbol in a second transmission frame.

Optionally, the embodiment shown in FIG. 10 further includes step 1003a, and step 1003a may be performed before step 1003.

1003a: The fourth communication device determines the length of the ACP.

Step 1002a to step 1003 are similar to step 903a to step 904 in the embodiment shown in FIG. 9. For details, refer to the related descriptions of step 903a to step 904 in the embodiment shown in FIG. 9. Details are not described herein again.

It should be noted that the embodiment shown in FIG. 10 may be performed after the embodiment shown in FIG. 2, to alleviate or avoid co-channel coverage interference between the first communication device and the second communication device. It can be learned that, in the technical solution of this application, a protection area does not need to be set to resolve a problem that the first communication device and the second communication device cannot provide services for a terminal device in the protection area.

Optionally, interference coordination may be alternatively performed between the first communication device and the second communication device by using a method similar to that shown in FIG. 7. Specifically, the first communication device indicates, to the second communication device by using indication information, a downlink time-frequency resource used by a cell of the first communication device. Then, the second communication device can determine, based on the downlink time-frequency resource used by the cell of the first communication device, an uplink time-frequency resource used by the second communication device.

The downlink time-frequency resource used by the cell of the first communication device does not overlap the uplink time-frequency resource used by the second communication device, or there is a corresponding guard band between the downlink time-frequency resource used by the cell of the first communication device and the uplink time-frequency resource used by the second communication device. A size of the guard band may be set based on a moment difference between a moment at which an uplink signal between the second communication device and the fourth communication device arrives at a third communication device and a moment at which a downlink signal between the first communication device and the third communication device arrives at the third communication device. In other words, influence of interference is reduced by negotiating time-frequency resources used by the first communication device and the second communication device, to ensure that no satellite uplink user near a user that receives a base station downlink signal performs transmission by using a similar or same time-frequency resource. An interference coordination process between the first communication device and the second communication device may be performed after the embodiment shown in FIG. 2, to alleviate or avoid co-channel coverage interference between the first communication device and the second communication device. In this way, the first communication device and the second communication device provide communication services for a terminal device in co-channel coverage. It can be learned that, in the technical solution of this application, the protection area does not need to be set to resolve the problem that the first communication device and the second communication device cannot provide the services for the terminal device in the protection area.

The foregoing cases A to D are solutions for analyzing possible interference cases and corresponding interference protocols. In actual application, there may be one case shown above, or there may be a plurality of cases shown above at the same time.

Figures 11, 12:
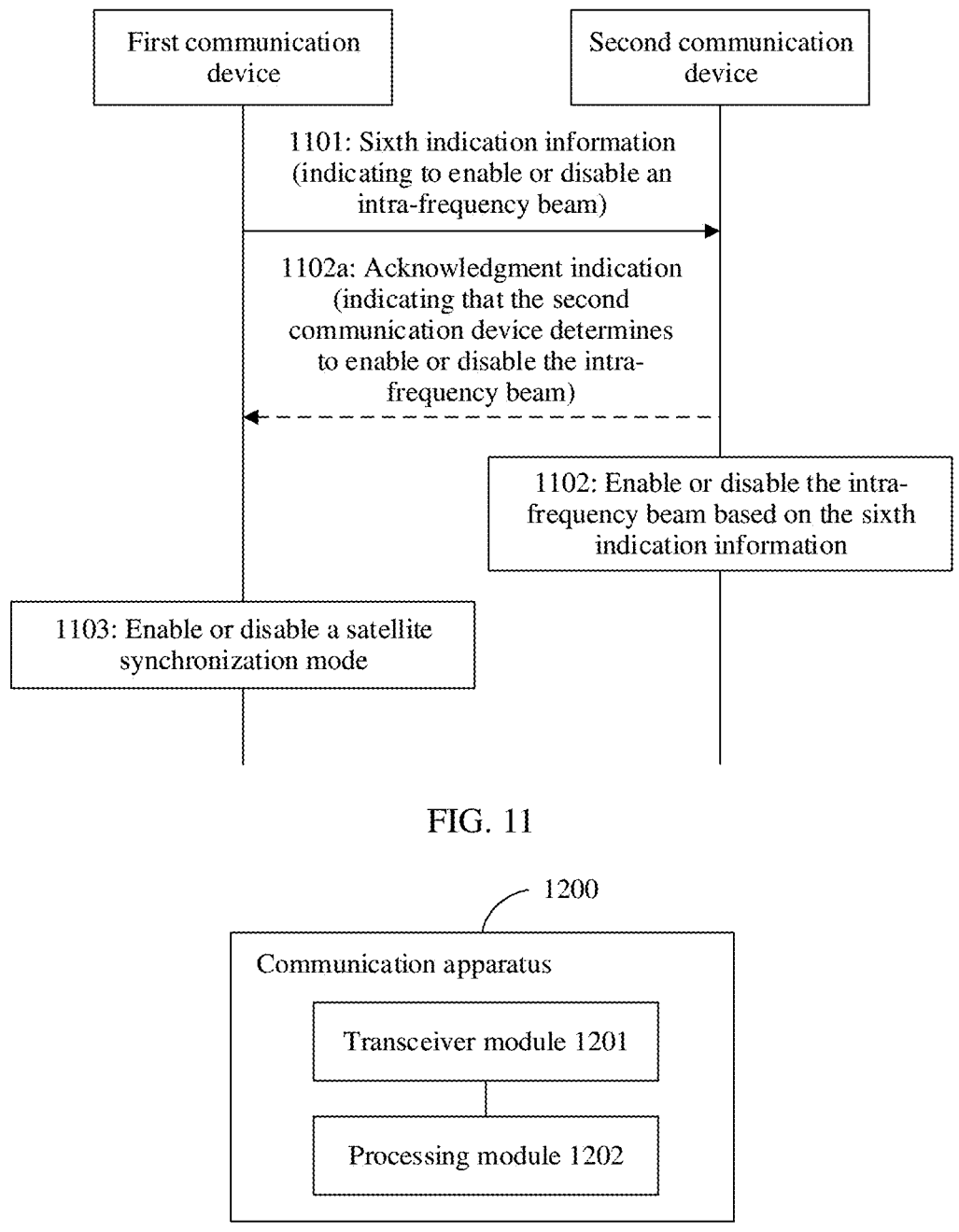
FIG. 11 is a schematic diagram of another embodiment of a communication method according to an embodiment of this application.
FIG. 12 is a schematic diagram of a structure of a communication apparatus according to an embodiment of this application.

FIG. 11 is a schematic diagram of another embodiment of a communication method according to an embodiment of this application. Refer to FIG. 11. The method includes the following steps.

1101: A first communication device sends sixth indication information to a second communication device, where the sixth indication information indicates to enable or disable an intra-frequency beam.

The following describes a possible implementation of step 1101 with reference to step 1101a and step 1101b.

1101a: The first communication device determines, based on a data amount of a service in a cell of the first communication device, a time-frequency resource required by the cell and/or a subcarrier spacing used by the first communication device.

Specifically, the first communication device may estimate, based on the data amount of the service in the cell of the first communication device, the time-frequency resource required by the cell of the first communication device and/or the subcarrier spacing that needs to be used.

1101b: The first communication device sends the sixth indication information to the second communication device based on second information.

Optionally, the second information includes at least one of the following: the service in the cell, the time-frequency resource required by the cell of the first communication device, and the subcarrier spacing used by the first communication device.

In some implementations, when the cell of the first communication device does not need to use a first subcarrier spacing to provide a service, the first communication device sends the sixth indication information to the second communication device. The sixth indication information indicates the second communication device to enable the intra-frequency beam. The first subcarrier spacing is greater than a fifth threshold.

For example, the first subcarrier spacing is 240 kHz (kilohertz).

Optionally, when the cell of the first communication device uses the first subcarrier spacing, the first communication device and the second communication device perform interference coordination in a manner of setting an ACP before a symbol, and a ratio of a length of the ACP to a symbol length is greater than or equal to ¼. The symbol length is equal to 1/first subcarrier spacing. When the ratio of the length of the ACP to the symbol length is greater than or equal to ¼, a corresponding subcarrier spacing value may be set to the fifth threshold.

For example, it can be learned from the embodiment shown in FIG. 6 that a larger subcarrier spacing indicates a smaller symbol length, and a larger ratio of the length of the ACP to the symbol length indicates higher ACP overheads. Therefore, when the subcarrier spacing is large (for example, the subcarrier spacing is 240 kHz, a length of one symbol is ¹⁄240=4.17 μs, and ACP=2.08 μs. In this case, the ratio of the length of the ACP to the symbol length is greater than ¼), transmission efficiency may be low if interference coordination is implemented in the manner of setting the ACP before the symbol. Therefore, when the subcarrier spacing is large, the first communication device may indicate the second communication device not to enable the intra-frequency beam, and the first communication device does not enable a satellite synchronization mode. When the subcarrier spacing is small, the first communication device may indicate the second communication device to enable the intra-frequency beam, and the first communication device enables the satellite synchronization mode. The satellite synchronization module includes: The first communication device monitors a first signal of the second communication device, and adjusts a start moment of a first transmission frame or an end moment of the first transmission frame based on the first signal. In other words, the first communication device starts to perform the solution of step 201 and step 202 in the embodiment shown in FIG. 2. For related descriptions of the first signal and the first transmission frame, refer to the related descriptions in the embodiment shown in FIG. 2.

In some implementations, when a ratio of the time-frequency resource required by the cell of the first communication device to an available time-frequency resource of the first communication device is less than a fourth threshold, and/or a ratio of an overlapping area between a first band and a second band to the second band is less than a sixth threshold, the first communication device sends the sixth indication information to the second communication device, where the sixth indication information indicates the second communication device to enable the intra-frequency beam.

For the first band and the second band, refer to the related descriptions in the embodiment shown in FIG. 2. The fourth threshold and the sixth threshold may be set based on an actual requirement. For example, the fourth threshold is 0.7 or 0.8, and the sixth threshold may be 0.5.

In this implementation, if the ratio of the time-frequency resource required by the cell of the first communication device to the available time-frequency resource of the first communication device is small, and the ratio of the overlapping area between the first band and the second band to the second band is small, it may be understood that the first communication device may use an extra available time-frequency resource for interference coordination. For example, the ACP is set before each symbol, or a guard band is reserved between a time-frequency resource used by the cell of the first communication device and a time-frequency resource used by the second communication device. If the time-frequency resource required by the cell of the first communication device is large, in other words, a service volume is large, and the ratio of the time-frequency resource required by the cell of the first communication device to the available time-frequency resource of the first communication device is large, the first communication device may use an extra available time-frequency resource for interference coordination, and the first communication device may indicate the second communication device to disable the intra-frequency beam.

For example, when the time-frequency resource required by the cell occupies 70% of the available time-frequency resource of the first communication device, the first communication device may send the sixth indication information to the second communication device, where the sixth indication information indicates the second communication device to enable the intra-frequency beam. Extra 30% of the available time-frequency resource of the first communication device may be used for interference coordination. The first communication device enables the satellite synchronization mode.

In some implementations, when the service in the cell of the first communication device has high importance, the first communication device sends the sixth indication information to the second communication device, where the sixth indication information indicates the second communication device to disable the intra-frequency beam. For example, the first communication device is a terrestrial base station, the second communication device is a satellite device, and the service in the cell has a requirement of a low delay, a high throughput, or the like, and may be provided by the terrestrial base station. In this case, the terrestrial base station may indicate the satellite device to disable the intra-frequency beam, and the first communication device disables the satellite synchronization mode.

In some implementations, when the service in the cell of the first communication device has low importance, the first communication device sends the sixth indication information to the second communication device, where the sixth indication information indicates the second communication device to enable or disable the intra-frequency beam. For example, if a local service has low importance, the terrestrial base station may indicate the satellite device to disable the intra-frequency beam, the terrestrial base station disables the satellite synchronization mode, and the terrestrial base station provides a service for a user in a cell. Alternatively, the terrestrial base station does not provide a service for a user in a cell, the satellite device enables the intra-frequency beam, and the satellite device provides a service for the user in the cell.

1102: The second communication device enables or disables the intra-frequency beam based on the sixth indication information.

In a possible implementation, the second communication device may enable or disable the intra-frequency beam based on the sixth indication information. For example, the sixth indication information indicates to enable the intra-frequency beam, and the second communication device enables the intra-frequency beam. The sixth indication information indicates to disable the intra-frequency beam, and the second communication device disables the intra-frequency beam.

In another possible implementation, the second communication device enables or disables the intra-frequency beam based on a service load status of the second communication device and the sixth indication information. For example, the sixth indication information indicates to enable the intra-frequency beam, but when a service load of the second communication device is heavy, the second communication device may not enable the intra-frequency beam.

Optionally, the embodiment shown in FIG. 11 further includes step 1102*a*, and step 1102*a* may be performed before step 1102.

1102*a*: The second communication device sends an acknowledgment indication to the first communication device, where the acknowledgment indication indicates that the second communication device determines to enable or disable the intra-frequency beam.

For example, when the sixth indication information indicates to enable the intra-frequency beam (for example, when a bit value of the sixth indication information is "1", it indicates that the intra-frequency beam is enabled), and the second communication device determines to enable the intra-frequency beam, the second communication device sends the acknowledgment indication to the first communication device, where the acknowledgment indication indicates that the second communication device determines to enable the intra-frequency beam. Then, the second communication device enables the intra-frequency beam.

For example, when the sixth indication information indicates to disable the intra-frequency beam (for example, when the bit value of the sixth indication information is "0", it indicates that the intra-frequency beam is disabled), and the second communication device determines to disable the intra-frequency beam, the second communication device sends the acknowledgment indication to the first communication device, where the acknowledgment indication indicates that the second communication device disables the intra-frequency beam. Then, the second communication device disables the intra-frequency beam. Alternatively, the second communication device determines to enable the intra-frequency beam, and sends the acknowledgment indication to the first communication device, where the acknowledgment indication indicates that the second communication device determines to enable the intra-frequency beam. The first communication device may not provide a service for a user in a cell, and does not enable the satellite synchronization mode. In other words, the second communication device provides a service for the user in the cell.

1103: The first communication device enables or disables the satellite synchronization mode.

The satellite synchronization module includes: The first communication device monitors the first signal of the second communication device, and adjusts the start moment of the first transmission frame or the end moment of the first transmission frame based on the first signal. In other words, the first communication device starts to perform the solution of step 201 and step 202 in the embodiment shown in FIG. 2. For related descriptions of the first signal and the first transmission frame, refer to the related descriptions in the embodiment shown in FIG. 2.

For a related example of enabling or disabling the satellite synchronization mode by the first communication device in step 1103, refer to the related descriptions of step 1101 and step 1102.

It should be noted that, optionally, when a plurality of terrestrial base stations need to interact with the satellite device, the plurality of terrestrial base stations may first perform interaction and determine that one of the terrestrial base stations indicates the satellite device whether to enable the intra-frequency beam, or the plurality of terrestrial base stations may be classified into corresponding terrestrial base station groups, and terrestrial base stations in each terrestrial base station group perform negotiation to determine that one terrestrial base station in the terrestrial base station group indicates the satellite device whether to enable the intra-frequency beam.

It should be noted that, optionally, the sixth indication information in step 1101 either indicates to enable the intra-frequency beam, or indicates the second communication device to disable the intra-frequency beam. In actual application, the sixth indication information may alternatively be indicated in another manner. For example, the first communication device sets a plurality of possible indication cases based on emergency degrees of services in the cell. For example, when a value of the sixth indication information is "1", it indicates that the second communication device is indicated to enable the intra-frequency beam. When the value of the sixth indication information is "0", it indicates that the second communication device is indicated to disable the intra-frequency beam. When the value of the sixth indication information is "2", it indicates that the second communication device may enable or disable the intra-frequency beam. Specifically, the second communication device determines to enable or disable the intra-frequency beam. Alternatively, when the value of the sixth indication information is "0", it indicates that the second communication device is indicated to disable the intra-frequency beam, in other words, the second communication device is forced to disable the intra-frequency beam. When the value of the sixth indication information is not "0", it indicates that the second communication device may determine whether to enable the intra-frequency beam.

In this embodiment of this application, the first communication device sends the sixth indication information to the second communication device, where the sixth indication information indicates to enable or disable the intra-frequency beam. The first communication device enables or disables the satellite synchronization mode. In other words, the first communication device indicates the second communication device to enable or disable the intra-frequency beam by using the technical solution in this application, so that co-channel coverage of the first communication device and the second communication device can be enabled or disabled more flexibly based on an actual requirement.

It should be noted that the embodiment shown in FIG. 11 shows a solution in which the first communication device indicates the second communication device to enable or disable the intra-frequency beam. In actual application, the second communication device may alternatively determine whether to enable the intra-frequency beam. For example, the satellite device determines whether an intra-frequency base station exists in a coverage area of the satellite device. If the intra-frequency base station exists, the satellite device may disable the intra-frequency beam and use an inter-frequency beam, to avoid co-channel interference.

The following describes the communication apparatus provided in embodiments of this application. FIG. 12 is a schematic diagram of a structure of a communication apparatus according to an embodiment of this application. A communication apparatus 1200 may be configured to perform the steps performed by the first communication device in the embodiments shown in FIG. 2 and FIG. 6 to FIG. 11. For details, refer to related descriptions in the foregoing method embodiments.

The communication apparatus 1200 includes a transceiver module 1201 and a processing module 1202. The transceiver module 1201 may implement corresponding communication functions, and the transceiver module 1201 may also be referred to as a communication interface or a communication module. The processing module 1202 is configured to perform processing operations.

Optionally, the communication apparatus 1200 may further include a storage module. The storage module may be configured to store instructions and/or data. The processing module 1202 may read the instructions and/or the data in the storage module, so that the communication apparatus 1200 implements the method embodiments shown in FIG. 2 and FIG. 6 to FIG. 11.

Optionally, the transceiver module 1201 may include a sending module and a receiving module. The sending module is configured to perform sending operations in the method embodiments shown in FIG. 2 and FIG. 6 to FIG. 11. The receiving module is configured to perform receiving operations in the method embodiments shown in FIG. 2 and FIG. 6 to FIG. 11.

It should be noted that the communication apparatus 1200 may include the sending module, but does not include the receiving module. Alternatively, the communication apparatus 1200 may include the receiving module, but does not include the sending module. Specifically, it may depend on whether the foregoing solution executed by the communication apparatus 1200 includes sending actions and receiving actions.

The communication apparatus 1200 may be configured to perform the actions performed by the first communication device in the foregoing method embodiments. The communication apparatus 1200 may be the first communication device or a component that may be configured in the first communication device. The transceiver module 1201 is configured to perform a receiving-related operation on a side of the first communication device in the foregoing method embodiment, and the processing module 1202 is configured to perform a processing-related operation on the side of the first communication device in the foregoing method embodiment.

Specifically, the communication apparatus 1200 may be configured to perform the following solution:

The transceiver module 1201 is configured to receive a first signal from a second communication device, where a first band used for communication between the communication apparatus 1200 and a third communication device overlaps a second band used for communication between the second communication device and a fourth communication device.

The processing module 1202 is configured to adjust a start moment of a first transmission frame of the communication apparatus 1200 or an end moment of the first transmission frame based on the first signal, where a time interval between an adjusted start moment of the first transmission frame and a start moment of a second transmission frame of the second communication device falls within an interval from $T_1-T_2$ to $T_1+T_2$, and/or a time interval between an adjusted end moment of the first transmission frame and an end moment of the second transmission frame falls within an interval from $T_1-T_3$ to $T_1+T_3$; and $T_1$ is equal to 0 or a TA, $T_2$ is a first threshold, and $T_3$ is a second threshold.

Optionally, the processing module 1202 is specifically configured to:

determine the start moment of the second transmission frame or the end moment of the second transmission frame based on the first signal; and adjust the start moment of the first transmission frame or the end moment of the first transmission frame based on the start moment of the second transmission frame and/or the end moment of the second transmission frame.

Optionally, the second band is a frequency band used for downlink communication between the second communication device and the fourth communication device, and $T_1$ is equal to 0. The adjusted start moment of the first transmission frame is aligned with the start moment of the second transmission frame, and/or the adjusted end moment of the first transmission frame is aligned with the end moment of the second transmission frame.

Optionally, the second band is a frequency band used for uplink communication between the second communication device and the fourth communication device, and $T_1$ is equal to the TA. The processing module 1202 is specifically configured to: determine the TA; and adjust the start moment of the first transmission frame or the end moment of the first transmission frame based on the TA, where the time interval between the adjusted start moment of the first transmission frame and the start moment of the second transmission frame is time of the TA, and/or the time interval between the adjusted end moment of the first transmission frame and the end moment of the second transmission frame is the time of the TA.

Optionally, the processing module 1202 is specifically configured to:

receive first indication information from the second communication device, where the first indication information indicates the TA.

Optionally, the transceiver module 1201 is further configured to send the TA.

Optionally, the processing module 1202 is further configured to:

set an ACP before each symbol in the first transmission frame, where a length of the ACP is greater than or equal to a third threshold.

Optionally, the third threshold is any one of the following:

max(NCP, 2R/c), where max(NCP, 2R/c) is a maximum value of an NCP and 2R/c, R is a cell radius of the communication apparatus 1200, and c is a speed of light;

max(ECP, 2R/c), where max(ECP, 2R/c) is a maximum value of an ECP and 2R/c, R is a cell radius of the communication apparatus 1200, and c is a speed of light; or a sum of a length of an NCP and 2R/c.

Optionally, the processing module 1202 is specifically configured to:

determine the length of the ACP based on first information, where the first information includes at least one of the following: the cell radius R of the communication apparatus 1200, an angle between the second communication device and the ground, or a subcarrier spacing used by the communication apparatus 1200.

Optionally, the transceiver module 1201 is further configured to:

send second indication information, where the second indication information indicates to use the ACP.

Optionally, the second indication information further indicates the length of the ACP.

Optionally, the transceiver module 1201 is further configured to:

send third indication information to the second communication device, where the third indication information indicates the second communication device to enable the second band.

Optionally, the processing module 1202 is further configured to:

enable a satellite synchronization mode.

Optionally, the transceiver module 1201 is further configured to:

send fourth indication information to the second communication device, where the fourth indication information indicates a time-frequency resource used by a cell of the communication apparatus 1200.

In this embodiment of this application, the transceiver module 1201 is configured to receive the first signal from the second communication device. The first band used for communication between the communication apparatus 1200 and the third communication device overlaps the second band used for communication between the second communication device and the fourth communication device. The processing module 1202 is configured to adjust the start moment of the first transmission frame of the communication apparatus 1200 or the end moment of the first transmission frame based on the first signal. The time interval between the adjusted start moment of the first transmission frame and the start moment of the second transmission frame of the second communication device falls within the interval from $T_1-T_2$ to $T_1+T_2$, and/or the time interval between the adjusted end moment of the first transmission frame and the end moment of the second transmission frame falls within the interval from $T_1-T_3$ to $T_1+T_3$; and $T_1$ is equal to 0 or the TA, $T_2$ is the first threshold, and $T_3$ is the second threshold. Therefore, interference coordination or coordinated transmission is facilitated between the communication apparatus 1200 and the second communication device, to alleviate or avoid co-channel coverage interference between the communication apparatus 1200 and the second communication device. In this way, the communication apparatus 1200 and the second communication device provide communication services for a terminal device in co-channel coverage.

In a possible solution, the communication apparatus 1200 may be further configured to perform the following solution:

The transceiver module 1201 is configured to send sixth indication information to a second communication device, where the sixth indication information indicates the second communication device to enable or disable an intra-frequency beam.

The processing module 1202 is configured to enable or disable a satellite synchronization mode.

Optionally, the transceiver module 1201 is further configured to:

receive an acknowledgment indication from the second communication device, where the acknowledgment indication indicates that the second communication device determines to enable or disable the intra-frequency beam.

Optionally, the transceiver module 1201 is specifically configured to:

determine, based on a service in a cell of the communication apparatus 1200, a time-frequency resource required by the cell and a used subcarrier spacing; and send the sixth indication information to the second communication device based on second information, where the second information includes at least one of the following: the time-frequency resource, the service in the cell, and the subcarrier spacing used by the communication apparatus 1200.

Optionally, the transceiver module 1201 is specifically configured to:

send the sixth indication information to the second communication device when a ratio of the time-frequency resource used by the cell of the communication apparatus 1200 to an available time-frequency resource of the communication apparatus 1200 is less than a fourth threshold, and/or when the cell does not need to use a first subcarrier spacing to provide a service, where the sixth indication information indicates the second communication device to enable the intra-frequency beam, and the first subcarrier spacing is greater than or equal to a fifth threshold.

The processing module 1202 is specifically configured to: enable the satellite synchronization mode.

Optionally, the transceiver module 1201 is specifically configured to:

when the service in the cell of the communication apparatus 1200 has high importance, send the sixth indication information to the second communication device, where the sixth indication information indicates the second communication device to disable the intra-frequency beam.

The processing module 1202 is specifically configured to: disable the satellite synchronization mode.

Optionally, the transceiver module 1201 is specifically configured to:

when the service in the cell of the communication apparatus 1200 has low importance, the communication apparatus 1200 sends the sixth indication information to the second communication device, where the sixth indication information indicates the second communication device to enable the intra-frequency beam.

The processing module 1202 is specifically configured to: disable the satellite synchronization mode.

In this embodiment of this application, the transceiver module 1201 is configured to send the sixth indication information to the second communication device, where the sixth indication information indicates the second communication device to enable or disable the intra-frequency beam. The processing module 1202 is configured to enable or disable the satellite synchronization mode. The transceiver module 1201 may indicate the second communication device to enable or disable the intra-frequency beam, and then the processing module 1202 enables or disables the satellite synchronization module. The communication apparatus 1200 flexibly indicates the second communication device to enable the intra-frequency beam, which helps the communication apparatus 1200 properly indicate to enable the intra-frequency beam based on an actual requirement (for example, a service requirement).

Figure 13:
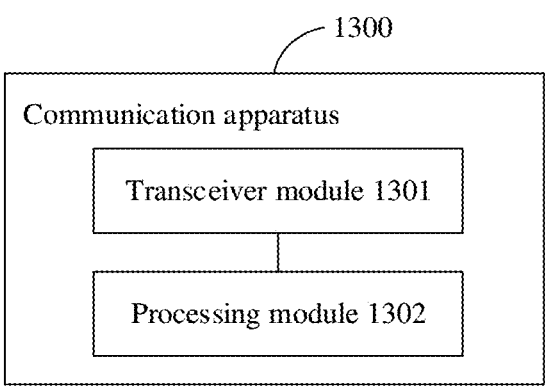
FIG. 13 is a schematic diagram of another structure of a communication apparatus according to an embodiment of this application.

The following describes the communication apparatus provided in embodiments of this application. FIG. 13 is a schematic diagram of a structure of a communication apparatus according to an embodiment of this application. A communication apparatus 1300 may be configured to perform the steps performed by the second communication device in the embodiments shown in FIG. 2 and FIG. 6 to FIG. 11. For details, refer to related descriptions in the foregoing method embodiments.

The communication apparatus 1300 includes a transceiver module 1301 and a processing module 1302. The transceiver module 1301 may implement corresponding communication functions, and the transceiver module 1301 may also be referred to as a communication interface or a communication module. The processing module 1302 is configured to perform processing operations.

Optionally, the communication apparatus 1300 may further include a storage module. The storage module may be configured to store instructions and/or data. The processing module 1302 may read the instructions and/or the data in the storage module, so that the communication apparatus implements the method embodiments shown in FIG. 2 and FIG. 6 to FIG. 11.

Optionally, the transceiver module 1301 may include a sending module and a receiving module. The sending module is configured to perform sending operations in the method embodiments shown in FIG. 2 and FIG. 6 to FIG. 11. The receiving module is configured to perform receiving operations in the method embodiments shown in FIG. 2 and FIG. 6 to FIG. 11.

It should be noted that the communication apparatus 1300 may include the sending module, but does not include the receiving module. Alternatively, the communication apparatus 1300 may include the receiving module, but does not include the sending module. Specifically, it may depend on whether the foregoing solution executed by the communication apparatus 1300 includes sending actions and receiving actions.

The communication apparatus 1300 may be configured to perform the actions performed by the second communication device in the foregoing method embodiments. The communication apparatus 1300 may be the second communication device or a component that may be configured in the second communication device. The transceiver module 1301 is configured to perform a receiving-related operation on a side of the second communication device in the foregoing method embodiment, and the processing module 1302 is configured to perform a processing-related operation on the side of the second communication device in the foregoing method embodiment.

Specifically, the communication apparatus 1300 may be configured to perform the following solution:

The transceiver module 1301 is configured to receive second indication information from a first communication device, where the second indication information indicates to use an ACP, and a first band used for communication between the first communication device and a third communication device overlaps a second band used for communication between the communication apparatus 1300 and a fourth communication device.

The processing module 1302 is configured to set the ACP before each symbol in a second transmission frame of the communication apparatus 1300 based on the second indication information.

Optionally, the processing module 1302 is further configured to:

determine a length of the ACP.

In another possible implementation, the second indication information further indicates the length of the ACP; and the processing module is specifically configured to:

determine the length of the ACP based on the second indication information.

Optionally, the processing module 1302 is specifically configured to:

determine the length of the ACP based on first information, where the first information includes at least one of the following: a cell radius R of the first communication device, an angle between the communication apparatus 1300 and the ground, or a subcarrier spacing used by the first communication device.

Optionally, the transceiver module 1301 is further configured to:

send a TA to the first communication device, where the TA is used by the first communication device to adjust a start moment of a first transmission frame of the first communication device and/or an end moment of the first transmission frame.

Optionally, the transceiver module 1301 is further configured to:

receive third indication information from the first communication device.

The processing module 1302 is further configured to:

enable the second band based on the third indication information.

Optionally, the transceiver module 1301 is further configured to:

send fifth indication information to the fourth communication device, where the fifth indication information indicates the fourth communication device to use the ACP.

In a possible solution, the communication apparatus 1300 may be further configured to perform the following solution:

The transceiver module 1301 is configured to receive fourth indication information from a first communication device, where the fourth indication information indicates a time-frequency resource used by a cell of the first communication device, and a first band used for communication between the first communication device and a third communication device overlaps a second band used for communication between the communication apparatus 1300 and a fourth communication device.

The processing module 1302 is configured to determine, based on the time-frequency resource used by the cell of the first communication device, a time-frequency resource used by the communication apparatus 1300, where the time-frequency resource used by the communication apparatus 1300 does not overlap the time-frequency resource used by the cell of the first communication device, or the time-frequency resource used by the communication apparatus 1300 and the time-frequency resource used by the cell of the first communication device are separated by a guard band of a first length in frequency domain.

In this embodiment of this application, the transceiver module 1301 is configured to receive second indication information from the first communication device, where the second indication information indicates to use an ACP. The processing module 1302 is configured to set the ACP before each symbol in a second transmission frame of the communication apparatus 1300 based on the second indication information. The processing module 1302 sets the ACP before each symbol in the second transmission frame of the communication apparatus 1300 based on the second indication information, to avoid or alleviate co-channel coverage interference between the first communication device and the communication apparatus 1300. In this way, the first communication device and the communication apparatus 1300 provide communication services for a terminal device in co-channel coverage.

In a possible solution, the communication apparatus 1300 may be further configured to perform the following solution:

The transceiver module 1301 is configured to receive sixth indication information from a first communication device, where the sixth indication information indicates the communication apparatus 1300 to enable or disable an intra-frequency beam.

The processing module 1302 is configured to enable or disable the intra-frequency beam based on the sixth indication information.

In a possible implementation, the transceiver module 1301 is further configured to: send an acknowledgment indication to the first communication device, where the acknowledgment indication indicates that the communication apparatus 1300 determines to enable or disable the intra-frequency beam.

In this embodiment of this application, the transceiver module 1301 is configured to receive the sixth indication information from the first communication device, where the sixth indication information indicates the communication apparatus 1300 to enable or disable the intra-frequency beam. The processing module 1302 is configured to enable or disable the intra-frequency beam based on the sixth indication information. The first communication device flexibly indicates the communication apparatus 1300 to enable the intra-frequency beam, which helps the first communication device properly indicate to enable the intra-frequency beam based on an actual requirement (for example, a service requirement).

Figure 14:
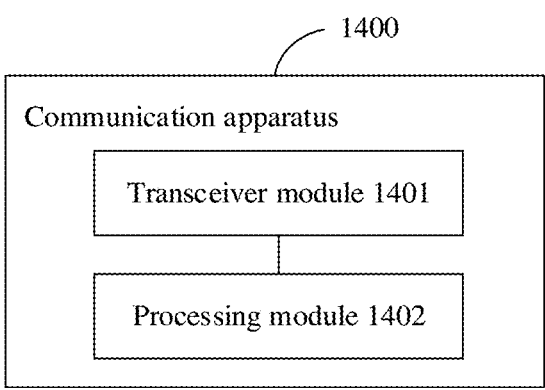
FIG. 14 is a schematic diagram of another structure of a communication apparatus according to an embodiment of this application.

The following describes the communication apparatus provided in embodiments of this application. FIG. 14 is a schematic diagram of a structure of a communication apparatus according to an embodiment of this application. A communication apparatus 1400 may be configured to perform the steps performed by the third communication device in the embodiments shown in FIG. 2, FIG. 8, and FIG. 9. For details, refer to related descriptions in the foregoing method embodiments.

The communication apparatus 1400 includes a transceiver module 1401 and a processing module 1402. The transceiver module 1401 may implement corresponding communication functions, and the transceiver module 1401 may also be referred to as a communication interface or a communication module. The processing module 1402 is configured to perform processing operations.

Optionally, the communication apparatus 1400 may further include a storage module. The storage module may be configured to store instructions and/or data. The processing module 1402 may read the instructions and/or the data in the storage module, so that the communication apparatus 1400 implements the method embodiments shown in FIG. 2, FIG. 8, and FIG. 9.

Optionally, the transceiver module 1401 may include a sending module and a receiving module. The sending module is configured to perform sending operations in the method embodiments shown in FIG. 2, FIG. 8, and FIG. 9. The receiving module is configured to perform receiving operations in the method embodiments shown in FIG. 2, FIG. 8, and FIG. 9.

It should be noted that the communication apparatus 1400 may include the sending module, but does not include the receiving module. Alternatively, the communication apparatus 1400 may include the receiving module, but does not include the sending module. Specifically, it may depend on whether the foregoing solution executed by the communication apparatus 1400 includes sending actions and receiving actions.

The communication apparatus 1400 may be configured to perform the actions performed by the third communication device in the foregoing method embodiments. The communication apparatus 1400 may be the third communication device or a component that may be configured in the third communication device. The transceiver module 1401 is configured to perform a receiving-related operation on a side of the third communication device in the foregoing method embodiment, and the processing module 1402 is configured to perform a processing-related operation on the side of the third communication device in the foregoing method embodiment.

The transceiver module 1401 is configured to receive second indication information from a first communication device, where the second indication information indicates the communication apparatus 1400 to use an ACP, and a first band used for communication between the first communication device and the communication apparatus 1400 overlaps a second band used for communication between a second communication device and a fourth communication device.

The processing module 1402 is configured to set, based on the second indication information, the ACP before each symbol of a first transmission frame transmitted between the communication apparatus 1400 and the first communication device.

In a possible implementation, the processing module 1402 is further configured to: determine a length of the ACP.

In another possible implementation, the second indication information indicates the length of the ACP; and the processing module is further configured to:

determine the length of the ACP based on the second indication information.

In another possible implementation, the processing module 1402 is further configured to:

determine the length of the ACP based on first information, where the first information includes at least one of the following: a cell radius R of the first communication device, an angle between the second communication device and the ground, or a subcarrier spacing used by the first communication device.

The first band used for communication between the first communication device and the communication apparatus 1400 overlaps the second band used for communication between the second communication device and the fourth communication device.

In another possible implementation, the transceiver module 1401 is further configured to:

receive a TA from the first communication device.

The processing module 1402 is further configured to:

adjust a start moment of the first transmission frame and/or an end moment of the first transmission frame based on the TA, where a time interval between an adjusted start moment of the first transmission frame and a start moment of a second transmission frame falls within an interval from $T_1 - T_2$ to $T_1 + T_2$, and/or a time interval between an adjusted end moment of the first transmission frame and an end moment of the second transmission frame falls within an interval from $T_1 - T_3$ to $T_1+T_3$; and $T_1$ is equal to 0 or the TA, $T_2$ is a first threshold, $T_3$ is a second threshold, and the second transmission frame is a transmission frame between the fourth communication device and the second communication device.

In this embodiment of this application, the transceiver module 1401 is configured to receive the second indication information from the first communication device, where the second indication information indicates the communication apparatus 1400 to use the ACP. The processing module 1402 is configured to set, based on the second indication information, the ACP before each symbol of the first transmission frame transmitted between the communication apparatus 1400 and the first communication device. Therefore, co-channel coverage interference between the first communication device and the second communication device is avoided or alleviated. In this way, the first communication device and the second communication device provide communication services for a terminal device in co-channel coverage.

Figure 15:
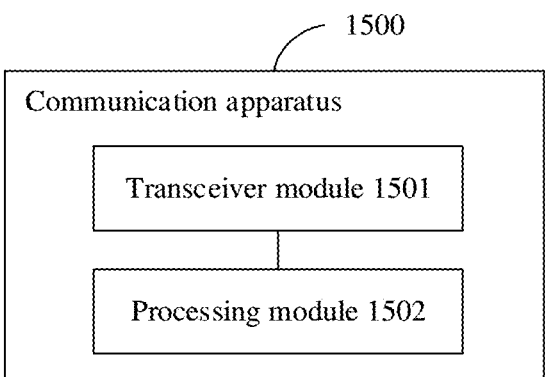
FIG. 15 is a schematic diagram of another structure of a communication apparatus according to an embodiment of this application.

The following describes the communication apparatus provided in embodiments of this application. FIG. 15 is a schematic diagram of a structure of a communication apparatus according to an embodiment of this application. A communication apparatus 1500 may be configured to perform the steps performed by the fourth communication device in the embodiments shown in FIG. 9 and FIG. 10. For details, refer to related descriptions in the foregoing method embodiments.

The communication apparatus 1500 includes a transceiver module 1501 and a processing module 1502. The transceiver module 1501 may implement corresponding communication functions, and the transceiver module 1501 may also be referred to as a communication interface or a communication module. The processing module 1502 is configured to perform processing operations.

Optionally, the communication apparatus 1500 may further include a storage module. The storage module may be configured to store instructions and/or data. The processing module 1502 may read the instructions and/or the data in the storage module, so that the communication apparatus 1500 implements the method embodiments shown in FIG. 9 and FIG. 10.

Optionally, the transceiver module 1501 may include a sending module and a receiving module. The sending module is configured to perform sending operations in the method embodiments shown in FIG. 9 and FIG. 10. The receiving module is configured to perform receiving operations in the method embodiments shown in FIG. 9 and FIG. 10.

It should be noted that the communication apparatus 1500 may include the sending module, but does not include the receiving module. Alternatively, the communication apparatus 1500 may include the receiving module, but does not include the sending module. Specifically, it may depend on whether the foregoing solution executed by the communication apparatus 1500 includes sending actions and receiving actions.

The communication apparatus 1500 may be configured to perform the actions performed by the fourth communication device in the foregoing method embodiments. The communication apparatus 1500 may be the fourth communication device or a component that may be configured in the fourth communication device. The transceiver module 1501 is configured to perform a receiving-related operation on a side of the fourth communication device in the foregoing method embodiment, and the processing module 1502 is configured to perform a processing-related operation on the side of the fourth communication device in the foregoing method embodiment.

The transceiver module 1501 is configured to receive fifth indication information from a second communication device, where the fifth indication information indicates the communication apparatus 1500 to use an ACP, and a second band used for communication between the second communication device and the communication apparatus 1500 overlaps a first band used for communication between a first communication device and a third communication device.

The processing module 1502 is configured to set, based on the fifth indication information, the ACP before each symbol of a second transmission frame transmitted between the communication apparatus 1500 and the second communication device.

In a possible implementation, the processing module 1502 is further configured to:

determine a length of the ACP.

In another possible implementation, the fifth indication information indicates the length of the ACP; and the processing module 1502 is specifically configured to:

determine the length of the ACP based on the fifth indication information.

In another possible implementation, the processing module 1502 is specifically configured to:

determine the length of the ACP based on first information, where the first information includes at least one of the following: a cell radius R of the first communication device, an angle between the second communication device and the ground, or a subcarrier spacing used by the first communication device.

The first band used for communication between the first communication device and the third communication device overlaps the second band used for communication between the second communication device and the communication apparatus 1500.

In this embodiment of this application, the transceiver module 1501 is configured to receive the fifth indication information from the second communication device, where the fifth indication information indicates the communication apparatus 1500 to use the ACP. The processing module 1502 is configured to set, based on the fifth indication information, the ACP before each symbol of the second transmission frame transmitted between the communication apparatus 1500 and the second communication device. Therefore, co-channel coverage interference between the first communication device and the second communication device is avoided or alleviated. In this way, the first communication device and the second communication device provide communication services for a terminal device in co-channel coverage.

An embodiment of this application further provides a communication apparatus 1600. The communication apparatus 1600 includes a processor 1610, and the processor 1610 is coupled to a memory 1620. The memory 1620 is configured to store a computer program or instructions and/or data. The processor 1610 is configured to execute the computer program or the instructions and/or the data stored in the memory 1620, so that the method in the foregoing method embodiment is performed.

Optionally, the communication apparatus 1600 includes one or more processors 1610.

Figure 16:
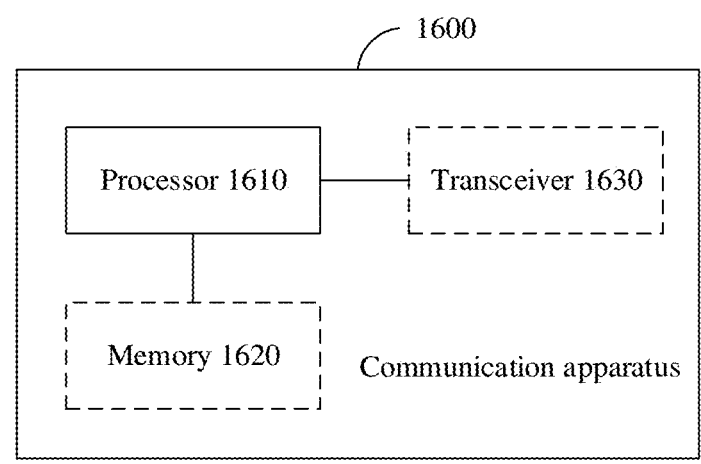
FIG. 16 is a schematic diagram of another structure of a communication apparatus according to an embodiment of this application.

Optionally, as shown in FIG. 16, the communication apparatus 1600 may further include the memory 1620.

Optionally, the communication apparatus 1600 may include one or more memories 1620.

Optionally, the memory 1620 and the processor 1610 may be integrated together, or disposed separately.

Optionally, as shown in FIG. 16, the communication apparatus 1600 may further include a transceiver 1630, and the transceiver 1630 is configured to receive a signal and/or send a signal. For example, the processor 1610 is configured to control the transceiver 1630 to receive the signal and/or send the signal.

In a solution, the communication apparatus 1600 is configured to implement the operations performed by the first communication device in the foregoing method embodiment.

For example, the processor 1610 is configured to implement a processing-related operation performed by the first communication device in the foregoing method embodiment, and the transceiver 1630 is configured to implement a transceiver-related operation performed by the first communication device in the foregoing method embodiment.

When the communication apparatus 1600 is a chip, the chip includes an input/output circuit and a communication interface. The processor is a processor, a microprocessor, or an integrated circuit integrated on the chip. A sending operation performed by the first communication device in the foregoing method embodiment may be understood as output of the chip, and a receiving operation performed by the first communication device in the foregoing method embodiment may be understood as input of the chip.

In a solution, the communication apparatus 1600 is configured to implement the operations performed by the second communication device in the foregoing method embodiment.

For example, the processor 1610 is configured to implement a processing-related operation performed by the second communication device in the foregoing method embodiment, and the transceiver 1630 is configured to implement a transceiver-related operation performed by the second communication device in the foregoing method embodiment.

When the communication apparatus 1600 is a chip, the chip includes an input/output circuit and a communication interface. The processor is a processor, a microprocessor, or an integrated circuit integrated on the chip. A sending operation performed by the second communication device in the foregoing method embodiment may be understood as output of the chip, and a receiving operation performed by the second communication device in the foregoing method embodiment may be understood as input of the chip.

An embodiment of this application further provides a communication apparatus 1700. The communication apparatus 1700 may be a terminal device or may be a chip. The communication apparatus 1700 may be configured to perform the operations performed by the third communication device or the fourth communication device in the foregoing method embodiment.

Figure 17:
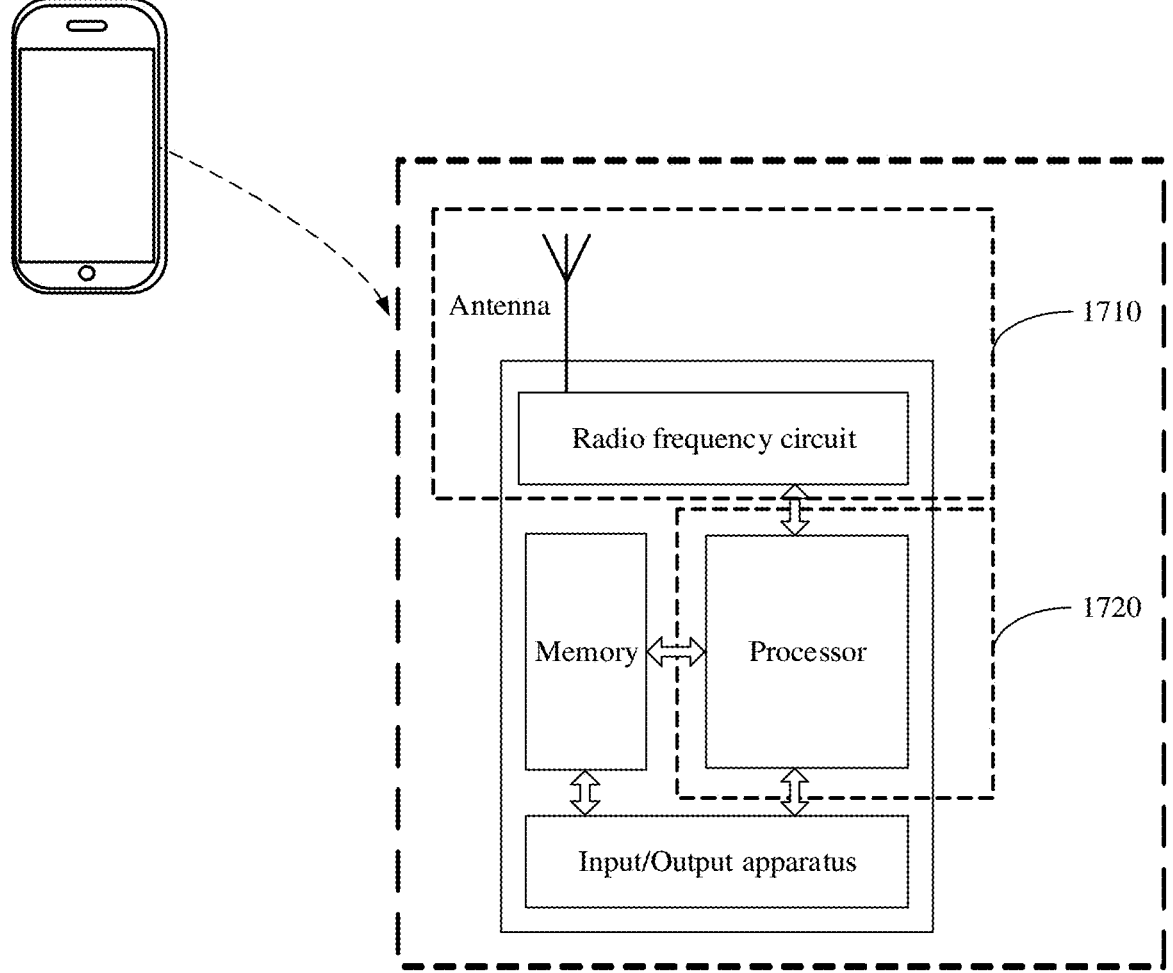
FIG. 17 is a schematic diagram of another structure of a communication apparatus according to an embodiment of this application.

When the communication apparatus 1700 is the terminal device, FIG. 17 is a simplified schematic diagram of a structure of the terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus.

The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive/send a radio frequency signal in a form of an electromagnetic wave. The input/output apparatus, for example, a touchscreen, a display, or a keyboard, is mainly configured to: receive data input by a user and output data to the user. It should be noted that some types of terminal devices may not have input/output apparatuses.

When data needs to be sent, the processor performs baseband processing on the to-be-sent data, and outputs a baseband signal to the radio frequency circuit. After performing radio frequency processing on the baseband signal, the radio frequency circuit sends a radio frequency signal to the outside in a form of an electromagnetic wave through the antenna. When data is to be sent to the terminal device, the radio frequency circuit receives a radio frequency signal through the antenna, converts the radio frequency signal into a baseband signal, and outputs the baseband signal to the processor. The processor converts the baseband signal into data and processes the data.

For ease of description, FIG. 17 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have a transceiver function may be considered as a transceiver module of the terminal device, and the processor that has a processing function may be considered as a processing module of the terminal device. As shown in FIG. 17, the terminal device includes a transceiver module 1710 and a processing module 1720. The transceiver module may also be referred to as a transceiver, a transceiver machine, a transceiver apparatus, or the like. The processing module may also be referred to as a processor, a processing board, a processing module, a processing apparatus, or the like.

Optionally, a component that is in the transceiver module 1710 and that is configured to implement a receiving function may be considered as a receiving module, and a component that is in the transceiver module 1710 and that is configured to implement a sending function may be considered as a sending module. In other words, the transceiver module 1710 includes the receiving module and the sending module. The transceiver module sometimes may also be referred to as a transceiver machine, a transceiver, a transceiver circuit, or the like. The receiving module sometimes may also be referred to as a receiver machine, a receiver, a receiving circuit, or the like. The sending module sometimes may also be referred to as a transmitter machine, a transmitter, a transmit circuit, or the like.

It should be understood that the transceiver module 1710 is configured to perform a sending operation and a receiving operation performed by the third communication device or the fourth communication device in the foregoing method embodiment, and the processing module 1720 is configured to perform an operation other than the sending and receiving operations performed by the third communication device or the fourth communication device in the foregoing method embodiment.

When the terminal device is the chip, the chip includes a transceiver module and a processing module. The transceiver module may be an input/output circuit or a communication interface. The processing module is a processor, a microprocessor integrated on the chip, an integrated circuit, or a logic circuit.

Figure 18:
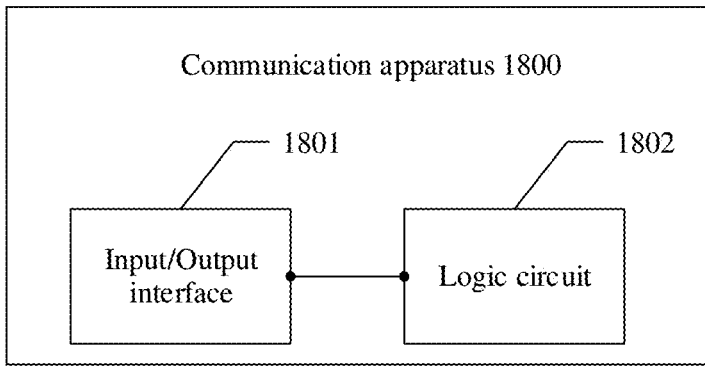
FIG. 18 is a schematic diagram of another structure of a communication apparatus according to an embodiment of this application.

This application further provides another communication apparatus. FIG. 18 is a schematic diagram of another structure of a communication apparatus according to this application. A communication apparatus 1800 includes an input/output interface 1801 and a logic circuit 1802.

In a possible implementation, the communication apparatus 1800 may be configured to perform some or all of the steps performed by the first communication device in the embodiments shown in FIG. 2 and FIG. 6 to FIG. 11.

Optionally, the input/output interface 1801 may have a function of the transceiver module 1201 in the embodiment shown in FIG. 12. The logic circuit 1802 may have a function of the processing module 1202 in the embodiment shown in FIG. 12.

Optionally, the input/output interface 1801 may be configured to perform a sending or receiving operation performed by the first communication device in the foregoing communication method, and the logic circuit 1802 may be configured to perform a processing operation performed by the first communication device in the foregoing communication method.

Figure 19:
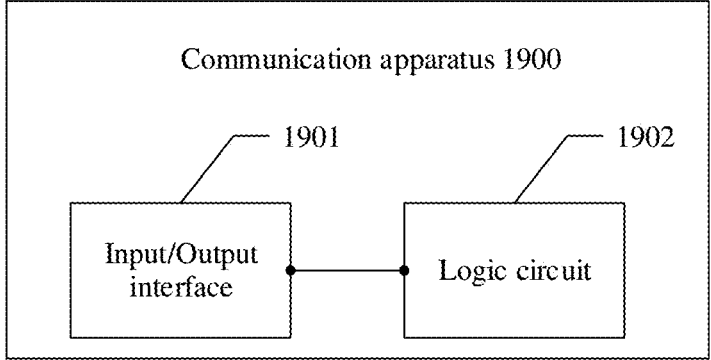
FIG. 19 is a schematic diagram of another structure of a communication apparatus according to an embodiment of this application.

This application further provides another communication apparatus. FIG. 19 is a schematic diagram of another structure of a communication apparatus according to this application. A communication apparatus 1900 includes an input/output interface 1901 and a logic circuit 1902.

In a possible implementation, the communication apparatus 1900 may be configured to perform some or all of the steps performed by the second communication device in the embodiments shown in FIG. 2 and FIG. 6 to FIG. 11.

Optionally, the input/output interface 1901 may have a function of the transceiver module 1301 in the embodiment shown in FIG. 13. The logic circuit 1902 may have a function of the processing module 1302 in the embodiment shown in FIG. 13.

Optionally, the input/output interface 1901 may be configured to perform a sending or receiving operation performed by the second communication device in the foregoing communication method, and the logic circuit 1902 may be configured to perform a processing operation performed by the second communication device in the foregoing communication method.

Figure 20:
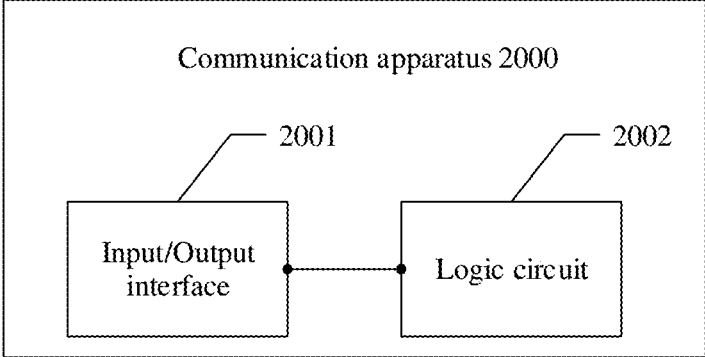
FIG. 20 is a schematic diagram of another structure of a communication apparatus according to an embodiment of this application.

This application further provides another communication apparatus. FIG. 20 is a schematic diagram of another structure of a communication apparatus according to this application. A communication apparatus 2000 includes an input/output interface 2001 and a logic circuit 2002.

In a possible implementation, the communication apparatus 2000 may be configured to perform some or all of the steps performed by the third communication device in the embodiments shown in FIG. 2, FIG. 8, and FIG. 9.

Optionally, the input/output interface 2001 may have a function of the transceiver module 1401 in the embodiment shown in FIG. 14. The logic circuit 2002 may have a function of the processing module 1402 in the embodiment shown in FIG. 14.

Optionally, the input/output interface 2001 may be configured to perform a sending or receiving operation performed by the third communication device in the foregoing communication method, and the logic circuit 2002 may be configured to perform a processing operation performed by the third communication device in the foregoing communication method.

Figure 21:
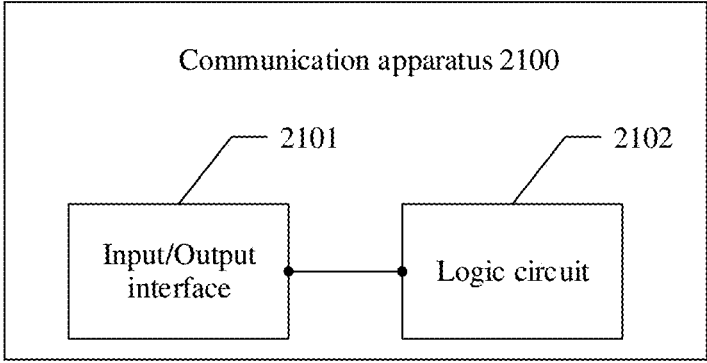
FIG. 21 is a schematic diagram of another structure of a communication apparatus according to an embodiment of this application.

This application further provides another communication apparatus. FIG. 21 is a schematic diagram of another structure of a communication apparatus according to this application. A communication apparatus 2100 includes an input/output interface 2101 and a logic circuit 2102.

In a possible implementation, the communication apparatus 2100 may be configured to perform some or all of the steps performed by the fourth communication device in the embodiments shown in FIG. 9 and FIG. 10.

Optionally, the input/output interface 2101 may have a function of the transceiver module 1501 in the embodiment shown in FIG. 15. The logic circuit 2102 may have a function of the processing module 1502 in the embodiment shown in FIG. 15.

Optionally, the input/output interface 2101 may be configured to perform a sending or receiving operation performed by the fourth communication device in the foregoing communication method, and the logic circuit 2102 may be configured to perform a processing operation performed by the fourth communication device in the foregoing communication method.

An embodiment of this application further provides a computer-readable storage medium. The computer-readable storage medium stores computer instructions for implementing the method performed by the terminal device or the method performed by the network device in the foregoing method embodiment.

For example, when a computer program is executed by a computer, the computer is enabled to implement the method performed by the terminal device or the method performed by the network device in the foregoing method embodiment.

An embodiment of this application further provides a computer program product including instructions. When the instructions are executed by a computer, the computer is enabled to implement the method performed by the terminal device or the method performed by the network device in the foregoing method embodiment.

An embodiment of this application further provides a communication system. The communication system includes the first communication device and the second communication device in the foregoing embodiments.

Optionally, the communication system further includes the third communication device and the fourth communication device in the foregoing embodiments.

An embodiment of this application further provides a chip apparatus, including a processor, configured to invoke a computer degree or computer instructions stored in a memory, so that the processor performs the methods in the embodiments shown in FIG. 2 and FIG. 6 to FIG. 11.

In a possible implementation, input of the chip apparatus corresponds to the receiving operations in the embodiments shown in FIG. 2 and FIG. 6 to FIG. 11, and output of the chip apparatus corresponds to the sending operations in the embodiments shown in FIG. 2 and FIG. 6 to FIG. 11.

Optionally, the processor is coupled to the memory through an interface, or the processor is integrated with the memory.

Optionally, the chip apparatus further includes the memory, and the memory stores the computer degree or the computer instructions.

The processor mentioned anywhere above may be a general-purpose central processing unit, a microprocessor, an application-specific integrated circuit (ASIC), or one or more integrated circuits configured to control program execution of the methods in the embodiments shown in FIG. 2 and FIG. 6 to FIG. 11. The memory mentioned anywhere above may be a read-only memory (ROM) or another type of static storage device that can store static information and instructions, a random access memory (RAM), or the like.

It may be clearly understood by a person skilled in the art that, for the purpose of convenient and brief description, for explanations of related content and beneficial effect in any of the foregoing provided communication apparatuses, refer to corresponding method embodiments provided above. Details are not described herein again.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules is merely logical function division, and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, that is, may be located in one position, or may be distributed on a plurality of network modules. Some or all of the modules may be selected based on an actual requirement to achieve the objectives of the solutions in embodiments.

In addition, functional modules in embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on this understanding, the technical solutions of this application essentially, or a part that contributes to the conventional technology, or all or a part of the technical solutions may be embodied in a form of a software product. The computer software product is stored in a storage medium, and includes several instructions for enabling a computer device (which may be a personal computer, a server, a network device, or the like) to perform all or some steps of the methods in embodiments of this application. The foregoing storage medium includes any medium that can store program code, for example, a USB flash drive, a removable hard disk, a read-only memory, a random access memory, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method for a first communication apparatus, wherein the method comprises:
   receiving, a first signal from a second communication apparatus, wherein a first band used for communication between the first communication apparatus and a third communication apparatus overlaps a second band used for communication between the second communication apparatus and a fourth communication apparatus; and
   adjusting a start moment of a first transmission frame of the first communication apparatus or an end moment of the first transmission frame based on the first signal, wherein:
      a time interval between an adjusted start moment of the first transmission frame and a start moment of a second transmission frame of the second communication apparatus falls within an interval from $T_1-T_2$ to $T_1+T_2$, or
      a time interval between an adjusted end moment of the first transmission frame and an end moment of the second transmission frame falls within an interval from $T_1-T_3$ to $T_1+T_3$, and
      wherein $T_1$ is equal to 0 or a timing advance (TA), $T_2$ is a first threshold, and $T_3$ is a second threshold.

2. The method according to claim 1, wherein the adjusting comprises:
   determining the start moment of the second transmission frame or the end moment of the second transmission frame based on the first signal; and
   adjusting the start moment of the first transmission frame or the end moment of the first transmission frame based on the start moment of the second transmission frame or the end moment of the second transmission frame.

3. The method according to claim 1,
   wherein the second band is a frequency band used for downlink communication between the second communication apparatus and the fourth communication apparatus, and $T_1$ is equal to 0; and
   wherein the adjusted start moment of the first transmission frame is aligned with the start moment of the second transmission frame, or the adjusted end moment of the first transmission frame is aligned with the end moment of the second transmission frame.

4. The method according to claim 1,
   wherein the second band is a frequency band used for uplink communication between the second communication apparatus and the fourth communication apparatus, and $T_1$ is equal to the TA; and
   wherein the adjusting, the start moment of the first transmission frame or the end moment of the first transmission frame based on the start moment of the second transmission frame or the end moment of the second transmission frame comprises:
      determining the TA; and
      adjusting the start moment of the first transmission frame or the end moment of the first transmission frame based on the TA, wherein the time interval between the adjusted start moment of the first transmission frame and the start moment of the second transmission frame is time of the TA, or the time interval between the adjusted end moment of the first transmission frame and the end moment of the second transmission frame is the time of the TA.

5. The method according to claim 4, wherein the determining the TA comprises:

receiving, first indication information from the second communication apparatus, wherein the first indication information indicates the TA.

6. The method according to claim 4, wherein the method further comprises:

sending the TA.

7. The method according to claim 1, wherein the method further comprises:

sending third indication information to the second communication apparatus, wherein the third indication information indicates to the second communication apparatus to enable the second band.

8. The method according to claim 1, wherein the method further comprises:

enabling a satellite synchronization mode.

9. The method according to claim 1, wherein the method further comprises:

sending fourth indication information to the second communication apparatus, wherein the fourth indication information indicates a time-frequency resource used by a cell of the first communication apparatus.

10. The method according to claim 1, wherein:

the time interval between the adjusted start moment of the first transmission frame and the start moment of the second transmission frame of the second communication apparatus falls within the interval from $T_1-T_2$ to $T_1+T_2$, and the time interval between the adjusted end moment of the first transmission frame and the end moment of the second transmission frame falls within the interval from $T_1-T_3$ to $T_1+T_3$.

11. A communication method for a first communication apparatus, wherein the method comprises:

receiving, a first signal from a second communication apparatus, wherein a first band used for communication between the first communication apparatus and a third communication apparatus overlaps a second band used for communication between the second communication apparatus and a fourth communication apparatus;

adjusting a start moment of a first transmission frame of the first communication apparatus or an end moment of the first transmission frame based on the first signal, wherein:

a time interval between an adjusted start moment of the first transmission frame and a start moment of a second transmission frame of the second communication apparatus falls within an interval from $T_1-T_2$ to $T_1+T_2$, or a time interval between an adjusted end moment of the first transmission frame and an end moment of the second transmission frame falls within an interval from $T_1-T_2$ to $T_1+T_2$, and wherein T is equal to 0 or a timing advance (TA), $T_2$ is a first threshold, and $T_2$ is a second threshold; and setting an advanced cyclic prefix (ACP) before each symbol in the first transmission frame, wherein a length of the ACP is greater than or equal to a third threshold.

12. The method according to claim 11, wherein the third threshold is any one of the following:

max (normal cyclic prefix (NCP), 2R/c), wherein max (NCP, 2R/c) is a maximum value of an NCP and 2R/c, R is a cell radius of the first communication apparatus, and c is a speed of light;

max (extended cyclic prefix (ECP), 2R/c), wherein max (ECP, 2R/c) is a maximum value of an ECP and 2R/c, R is a cell radius of the first communication apparatus, and c is a speed of light; or a sum of a length of an NCP and 2R/c, wherein R is a cell radius of the first communication apparatus, and c is a speed of light.

13. The method according to claim 11, wherein the method further comprises:

sending second indication information, wherein the second indication information indicates to use the ACP.

14. The method according to claim 13, wherein the second indication information further indicates the length of the ACP.

15. A first communication apparatus comprising:

at least one processor; and a non-transitory computer-readable medium including computer-executable instructions that, when executed by the processor, cause the apparatus to carry out a method including:

receiving a first signal from a second communication apparatus, wherein a first band used for communication between the first communication apparatus and a third communication apparatus overlaps a second band used for communication between the second communication apparatus and a fourth communication apparatus; and adjusting a start moment of a first transmission frame of the first communication apparatus or an end moment of the first transmission frame based on the first signal, wherein a time interval between an adjusted start moment of the first transmission frame and a start moment of a second transmission frame of the second communication apparatus falls within an interval from $T_1-T_2$ to $T_1+T_2$, or a time interval between an adjusted end moment of the first transmission frame and an end moment of the second transmission frame falls within an interval from $T_1-T_3$ to $T_1+T_3$, and wherein $T_1$ is equal to 0 or a timing advance (TA), $T_2$ is a first threshold, and $T_3$ is a second threshold.

16. The communication apparatus according to claim 15, wherein the adjusting comprises:

determining the start moment of the second transmission frame or the end moment of the second transmission frame based on the first signal; and adjusting the start moment of the first transmission frame or the end moment of the first transmission frame based on the start moment of the second transmission frame or the end moment of the second transmission frame.

17. The communication apparatus according to claim 15, wherein the second band is a frequency band used for downlink communication between the second communication apparatus and the fourth communication apparatus, and $T_1$ is equal to 0; and wherein the adjusted start moment of the first transmission frame is aligned with the start moment of the second transmission frame, or the adjusted end moment of the first transmission frame is aligned with the end moment of the second transmission frame.

18. The communication apparatus according to claim 15, wherein the second band is a frequency band used for uplink communication between the second communication apparatus and the fourth communication apparatus, and $T_1$ is equal to the TA; and wherein the adjusting, the start moment of the first transmission frame or the end moment of the first transmission frame based on the start moment of the second transmission frame or the end moment of the second transmission frame comprises:

determining the TA; and adjusting the start moment of the first transmission frame or the end moment of the first transmission frame based on the TA, wherein the time interval between the adjusted start moment of the first transmission frame and the start moment of the second transmission frame is time of the TA, or the time interval between the adjusted end moment of the first transmission frame and the end moment of the second transmission frame is the time of the TA.

19. The communication apparatus according to claim 18, wherein the determining the TA comprises:

receiving first indication information from the second communication apparatus, wherein the first indication information indicates the TA.

20. The communication apparatus according to claim 15, wherein the method further comprises:

setting an advanced cyclic prefix (ACP) before each symbol in the first transmission frame, wherein a length of the ACP is greater than or equal to a third threshold.

21. The communication apparatus according to claim 20, wherein the third threshold is any one of the following:

max (normal cyclic prefix (NCP), 2R/c), wherein max (NCP, 2R/c) is a maximum value of an NCP and 2R/c, R is a cell radius of the first communication apparatus, and c is a speed of light;

max (extended cyclic prefix (ECP), 2R/c), wherein max (ECP, 2R/c) is a maximum value of an ECP and 2R/c, R is a cell radius of the first communication apparatus, and c is a speed of light; or a sum of a length of an NCP and 2R/c, wherein R is a cell radius of the first communication apparatus, and c is a speed of light.

* * * * *